(12) United States Patent
Sakaue

(10) Patent No.: US 7,057,764 B1
(45) Date of Patent: Jun. 6, 2006

(54) COLOR IMAGE PROCESSING APPARATUS AND METHOD, AND STORAGE MEDIUM

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,379

(22) Filed: Mar. 8, 2000

(30) Foreign Application Priority Data

Mar. 9, 1999 (JP) ............................................ 11-062424

(51) Int. Cl.
 G06F 15/00 (2006.01)
 G06K 1/00 (2006.01)
 G06K 15/02 (2006.01)

(52) U.S. Cl. ........................ 358/1.9; 358/1.18; 382/266; 382/267; 382/268; 382/269

(58) Field of Classification Search ................ 358/1.18, 358/1.9, 232, 243, 296; 382/244, 245, 248, 382/254, 276, 266, 267, 268, 269
See application file for complete search history.

(56) References Cited

U.S. PATENT DOCUMENTS

| 5,134,667 | A | * | 7/1992 | Suzuki | 382/164 |
|---|---|---|---|---|---|
| 5,357,353 | A | * | 10/1994 | Hirota | 358/530 |
| 5,388,167 | A | * | 2/1995 | Koga et al. | 382/232 |
| 5,687,303 | A | * | 11/1997 | Motamed et al. | 358/1.18 |
| 5,710,582 | A | * | 1/1998 | Hawkins et al. | 347/42 |
| 5,774,126 | A | * | 6/1998 | Chatterjee et al. | 345/605 |
| 6,181,379 | B1 | * | 1/2001 | Kingetsu et al. | 348/364 |
| 6,285,461 | B1 | * | 9/2001 | Fujii et al. | 358/1.18 |

* cited by examiner

*Primary Examiner*—Edward Coles
*Assistant Examiner*—Chan S. Park
(74) *Attorney, Agent, or Firm*—Fitzpatrick, Cella, Harper & Scinto

(57) ABSTRACT

A full-color image input from an external apparatus can undergo an optimal adaptive process using an image area separation circuit mounted in a color copying machine main body, and also attribute map information, thus providing a higher-quality image. When a color copying machine (18) prints an image such as a computer graphics image sent from a host computer (10), a raster image processor (13) renders bitmap data of a given recording color on an image memory (15) on the basis of that print data, and stores attribute information in an attribute map memory (16) in units of pixels. The color copying machine (18) forms an image on the basis of image data of respective recording color components, which are frame-sequentially input from the raster image processor (13), and attribute information from the attribute map memory (16).

30 Claims, 26 Drawing Sheets

FIG. 3
IMAGE MEMORY
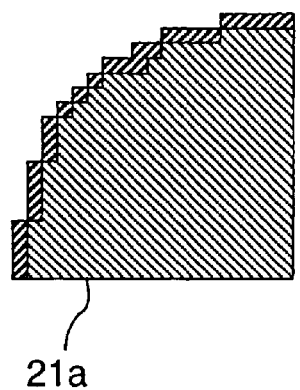
21a
ATTRIBUTE MAP MEMORY
VECTOR FLAG 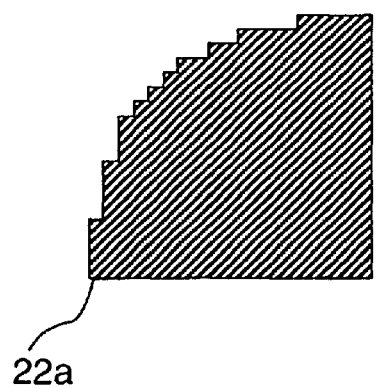
22a
CHARACTER FLAG 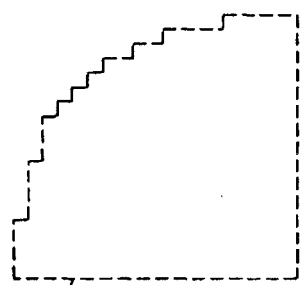
23a
EDGE FLAG 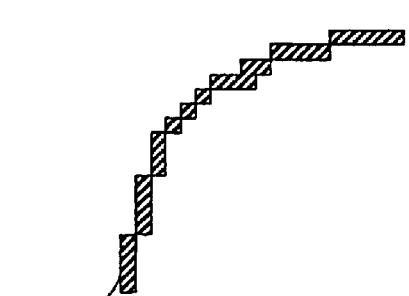
24a
EDGE BOUNDARY FLAG 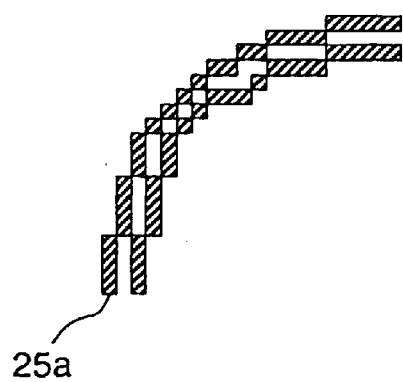
25a

FIG. 4
IMAGE MEMORY
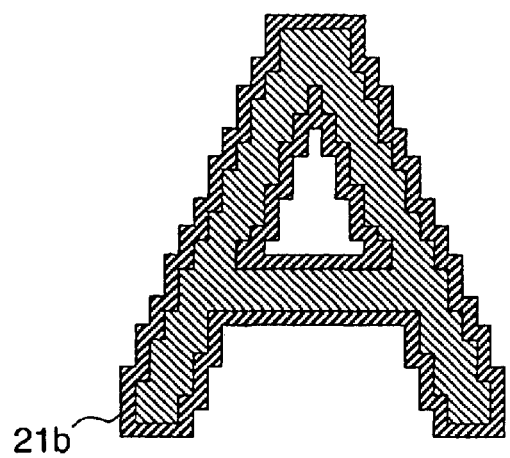
21b
ATTRIBUTE MAP MEMORY
VECTOR FLAG
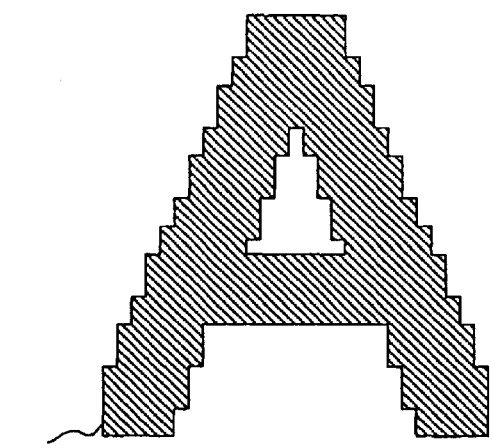
22b
CHARACTER FLAG
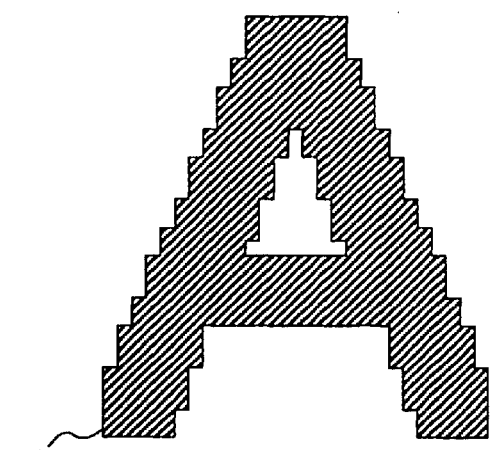
23b
EDGE FLAG
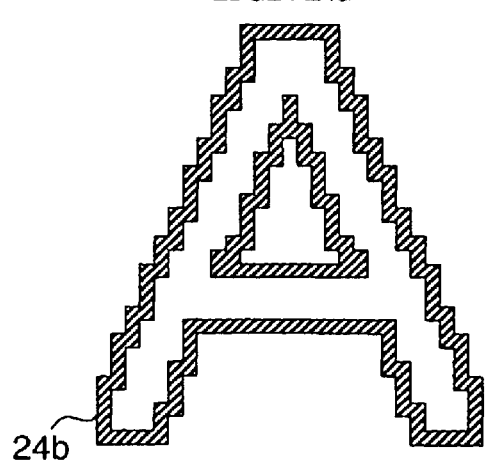
24b
EDGE BOUNDARY FLAG
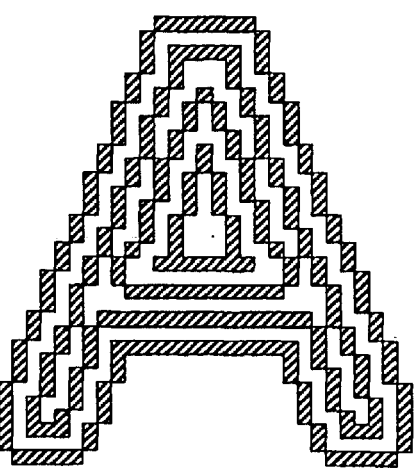
25b

FIG. 23

| A11 | A21 | A31 | A41 | A51 |
|-----|-----|-----|-----|-----|
| A12 | A22 | A32 | A42 | A52 |
| A13 | A23 | A33 | A43 | A53 |
| A14 | A24 | A34 | A44 | A54 |
| A15 | A25 | A35 | A45 | A55 |

DIRAMI VALUES OF SURROUNDING PIXELS
HAVING PIXEL OF INTEREST AS CENTER

COLOR IMAGE PROCESSING APPARATUS AND METHOD, AND STORAGE MEDIUM

FIELD OF THE INVENTION

The present invention relates to a color image processing apparatus and method, and a storage medium.

BACKGROUND OF THE INVENTION

Conventionally, a system as shown in FIG. 26 is known as a system mentioned above. FIG. 26 schematically shows the arrangement of a system that creates a page layout document of DTP or the like, or a wordprocessing or graphic document using a host computer 101, and outputs such document as a hardcopy via a color laser beam printer.

Reference numeral 102 denotes an application which runs on the host computer. For example, document edit application software such as "WORD®" available from Microsoft Corporation, page layout software such as PageMaker® available from Adobe Systems Incorporated, and the like are representative ones. A digital document created by such software is passed on to a printer driver 103 via an operating system (OS: not shown) of the computer. The digital document is expressed as a set of command data that represent figures, characters, and the like which form one page, and these commands are sent to the printer driver 103.

A series of commands that form a frame are expressed as a language system called PDL (page description language). For example, GDI (Microsoft Corporation), Postscript (Adobe Systems Incorporated), and the like are known as prevalent PDLs. The printer driver 103 converts data passed from the application into data in the PDL command format, and transfers them to a rasterizer 105 in a raster image processor 104.

The rasterizer 105 renders characters, figures, and the like expressed by PDL commands into a two-dimensional bitmap image that the printer actually outputs. This device is called a "rasterizer" since a bitmap image fills a two-dimensional plane as repetitions of linear rasters (lines). The rendered bitmap image is temporarily stored in an image memory 106. The rendered image data is sent to a color printer (copying machine) 107. The color copying machine 107 uses a known electrophotographic image forming unit 108, and prints out an image by forming a visible image on a paper sheet using such unit. The image data in the image memory is transferred in synchronism with a sync signal and clock signal required for operating the image forming unit, a transfer request of a specific color component signal, or the like.

By processing a full-color image transferred from an external apparatus using an adaptive processing circuit mounted in a color copying machine or the like, a higher-quality image that includes both characters and photos can be provided. However, when an image in the YMCK format is processed frame-sequentially in units of color components, since each process cannot specify color, character areas cannot always be perfectly detected by image area separation. Also, natural image areas may often be erroneously detected as character areas, resulting in poor reliability. Especially, determination errors stand out in an output of, e.g., a CG (computer graphics) image or the like, since such image suffers less noise. When an image is frame-sequentially processed by an YMCK interface, since no color information is available in each process, image area separation cannot always be perfectly attained.

SUMMARY OF THE INVENTION

The present invention has been made in consideration of the aforementioned problems, and has as its object to provide a color image processing apparatus and method, which can provide higher-quality images by implementing an optimal adaptive process of a full-color image input from an external apparatus using an image area separation circuit mounted in a color printer main body, and attribute map information, and a storage medium.

In order to achieve the above object, a color image processing apparatus according to one aspect of the present invention comprises the following arrangement. That is, there is provided a color image processing apparatus which comprises image area determination means for determining an image area according to a property of an image on the basis of color image data read by original reading means, first conversion means for converting the read color image data into one of recording color components, correction means for correcting the image data obtained by the first conversion means on the basis of a determination result of the image area determination means, and image forming means for forming an image of the corresponding recording color component on the basis of the image data corrected by the correction means, and which apparatus forms a color image by repeating the process of the image forming means in correspondence with the number of recording color components to superpose and record, comprising:

reception means for receiving print data including control information from an external apparatus;

generation means for generating image data of recording color components on the basis of the received print data, and generating attribute information for the generated image data;

second conversion means for converting data for one recording color component of the image data generated by the generation means into data in the same color component format as that used upon reading by the original reading means, and outputting the converted data to the image forming means; and control means for controlling the correction means in accordance with the attribute information.

It is another object of the present invention to provide an image processing apparatus which can prevent image deterioration by decreasing resolution differences in units of color components, which are produced by a process for reproducing a high-quality image.

It is still another object of the present invention to provide a novel function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a view showing the correspondence between the image and attribute information in the embodiment shown in FIG. 1;

FIG. 4 is a view showing the correspondence between the image and attribute information in the embodiment shown in FIG. 1;

FIG. 23 is a view for explaining counter edge detection rules of the embodiment shown in FIG. 1;

DETAILED DESCRIPTION OF THE PREFERRED EMBODIMENTS

In the embodiment to be described below, the present invention is applied to a digital color copying machine. The digital color copying machine has a unit for reading an original as color images of R, G, and B luminance components, and R, G, and B color image data obtained by that unit are converted into Y, M, and C or Y, M, C, and K data as recording color components (density color components) upon recording. Then, appropriate processes are done in units of image properties (attributes) that indicate whether or not an original image includes characters or line images, or a halftone image such as a photo. In order to implement such process, a technique such as an image area determination process or the like based on read R, G, and B color image data is required.

In this case, a problem is posed when a host computer is connected to such digital color copying machine, and Y, M, C, and K data of recording color components are frame-sequentially sent from the host computer.

Since image area determination is done based on R, G, and B data, if Y, M, C, and K data are frame-sequentially sent, the image area determination function cannot normally function using such data. That is, a new circuit must be added.

This embodiment solves this problem. That is, this embodiment allows to record a high-quality image by effectively using existing circuits.

A preferred embodiment according to the present invention will be described in detail below with reference to the accompanying drawings.

[First Embodiment]

Figure 1:
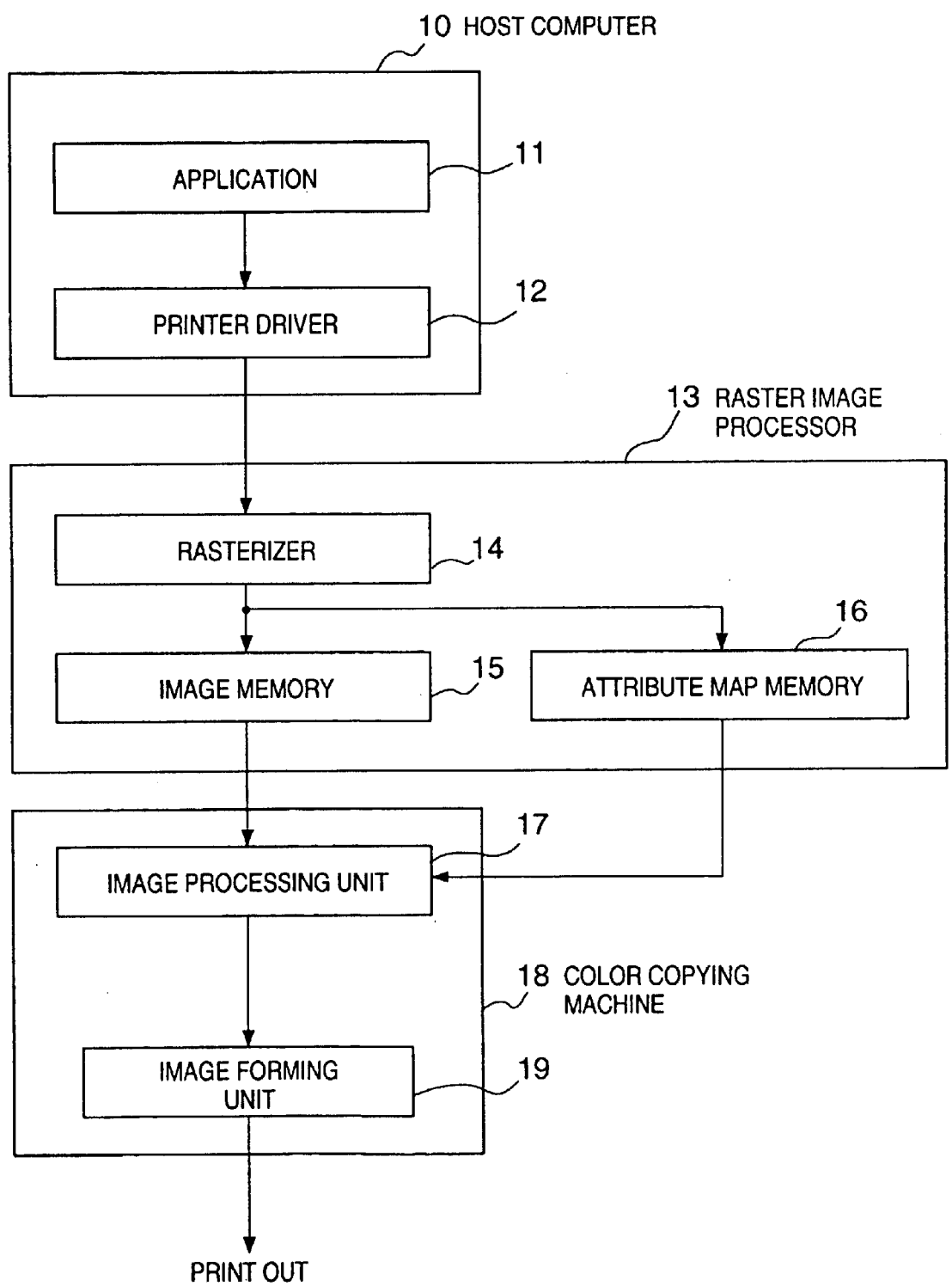
FIG. 1 is a system block diagram showing the arrangement according to an embodiment of the present invention.
Figure 26:
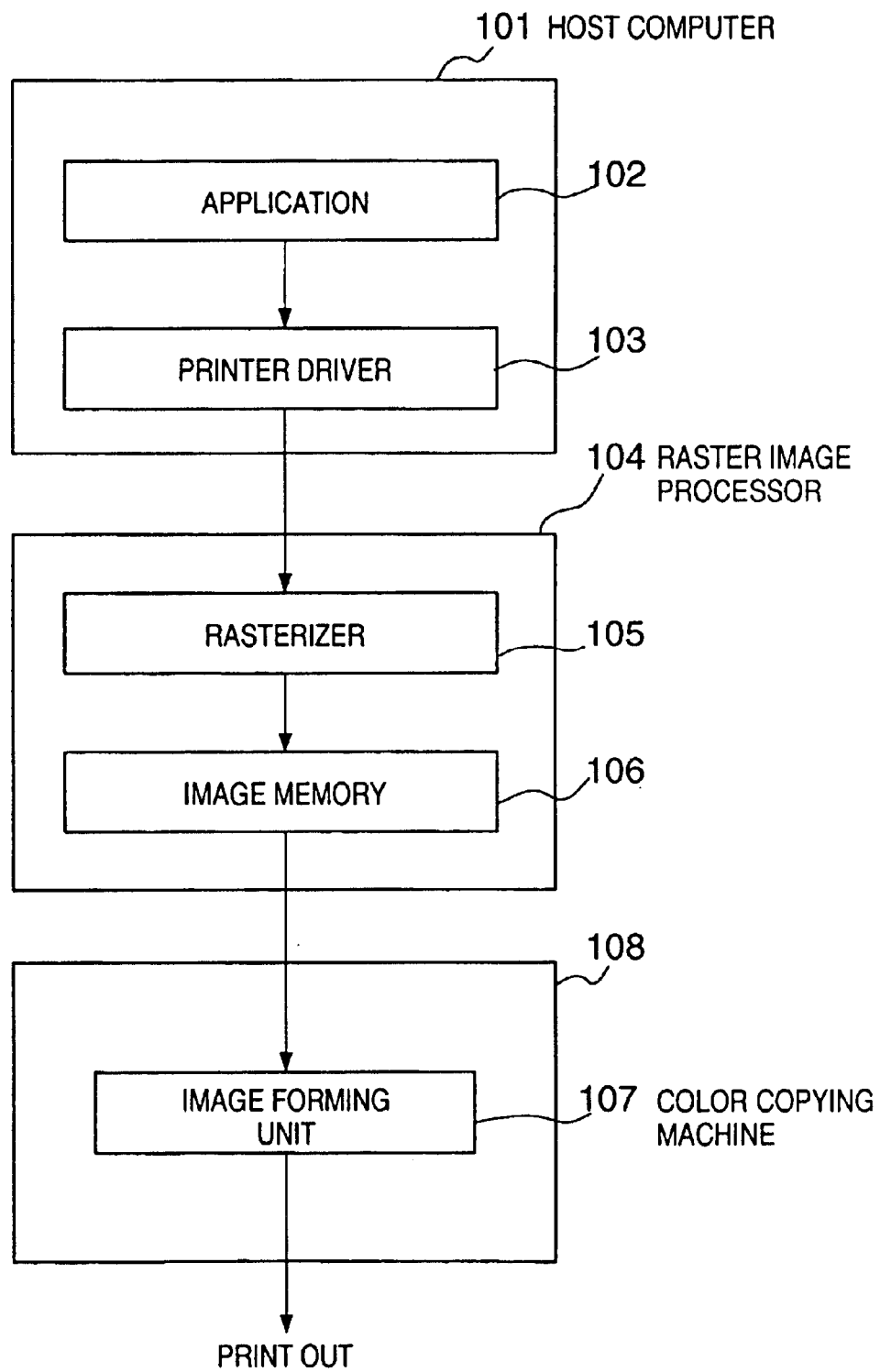
FIG. 26 is a block diagram showing the arrangement of a conventional system.

FIG. 1 is a system block diagram of this embodiment. In FIG. 1, reference numerals 10 to 15 denote the same components as the components 101 to 106 shown in FIG. 26. Also, reference numerals 18 and 19 denote the same components 107 and 108 in FIG. 26.

A characteristic feature of this embodiment lies in an attribute map memory 16 and image processing unit 17. A rasterizer 14 generates a bitmap image on an image memory 15 on the basis of print data (including various kinds of control information, rendering command, and grayscale image data) received from a host computer 10, i.e., on the basis of commands corresponding to individual image parts (to be referred to as objects hereinafter) that form an image (image forming unit 19). In this case, the rasterizer 14 generates attribute map information for attributes of the image parts and the generated bitmap image on the basis of information (commands) instructed by the print data, and writes the generated information in the attribute map memory 16.

More specifically, the rasterizer 14 generates attribute map information on the basis of attributes of commands that express objects and the generated bitmap image data to be written in the image memory 15, and can also look up the already rendered contents of the image memory 15 as bitmap image data at that time. The image processing unit 17 performs various image processes for the bitmap data in the image memory, and outputs data to the color copying machine. At this time, the unit 17 switches an image processing method as needed with reference to the attribute information in the attribute map memory 16.

The method of generating attribute map information will be described in detail below.

Figure 2:
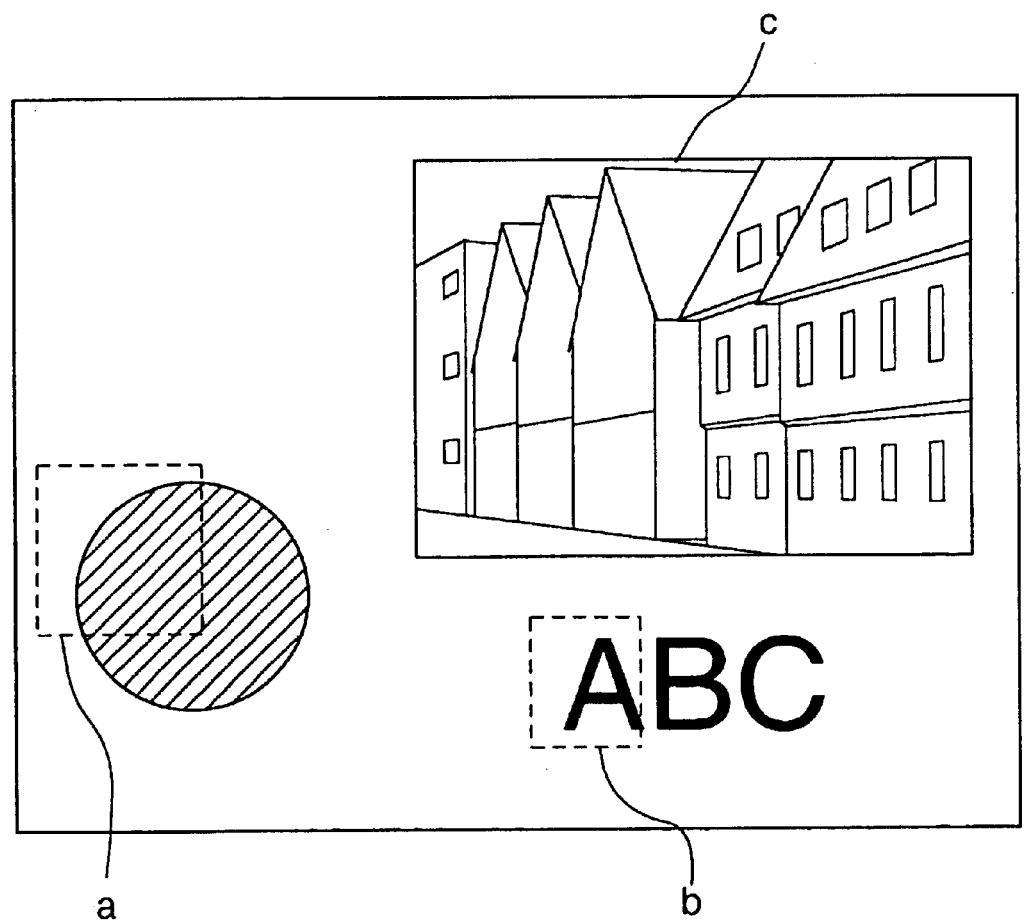
FIG. 2 shows an image to be printed in the embodiment shown in FIG. 1.

Assume that image data rendered on the image memory 15 is as shown in FIG. 2. FIGS. 3 and 4 are respectively enlarged views of portions (a) and (b) in FIG. 2. FIG. 3 shows a case wherein a bitmap image of a circle is generated on the basis of a command for drawing a circle. Reference numeral 21a denotes data to be written in the image memory. This data is obtained by arranging pixel values in units of small pixels as, e.g., 8-bit integer values in a two-dimensional matrix. Reference numerals 22a to 25a denote data to be written in the attribute map memory. In this embodiment, four kinds of attribute information flags are generated in the same pixel matrix as that of the image data in the image memory in units of bits (binary: 0 or 1). In FIG. 3, 0 expresses a white small rectangle, and 1 a black one. Reference numeral 22 denotes vector flags, each of which assumes 1 in a vector image area such as a character, graphic, and the like, and assumes 0 in a background portion or continuous tone photo portion ((c) in FIG. 2) other than the vector image area. Hence, all vector flags 22a inside the circle in FIG. 3 assume "1". Each vector flag 22a can normally be generated based on a command for drawing a circle. However, in this embodiment, since the contents of the data 21a are to be referred to, a new area painted by the data 21a is detected, and "1"s are set in that area to obtain the vector flags 22a. Reference numeral 23a denotes character flags, each of which assumes "1" in a character area, and "0" in other areas. The character flags 23a are all "0"s. Reference numeral 24a denotes edge flags, each of which assumes "1" in a boundary portion of the circle object. These flags can be generated by detecting pixels that change from 0 to 1 of the flags 22a, and setting "1" at the detected pixel positions. Reference numeral 25a denotes edge boundary flags, each of which assumes "1" at a neighboring pixel of the edge flag 24a. The edge boundary flags 25a can be generated on both the inner and outer sides of the edge by detecting pixels that neighbor one of four sides of pixels corresponding to the edge flags 24a=1, and setting "1" there. However, "1"s had better be set at only pixels outside the edge depending on the contents of image processes to be described later. In this case, edge boundary flags can be inhibited from being generated in a halftone portion (a gray area) inside the circle with reference to the flags 24a and also the original contents 21a of the image memory.

FIG. 4 shows an example of attribute map information generated for a character object. Although meanings of 21b to 25b are the same as those of 21a to 25a, and substantially the same attribute information is generated, only the character flag 23b is different from the flag 23a. This is because (b) in FIG. 2 is a character object, and character flags are set at "1" inside the character.

The attribute map information is generated in the aforementioned procedures. In this connection, all flags are set at "0" in a photo image (continuous tone image) area indicated by (c) in FIG. 2, and a background area where no image is drawn, as can be seen from the above description. The generated bitmap image data and attribute map data are transferred to the image processing unit 17 together with sync signals (not shown). At this time, data at a predetermined pixel position of the image memory, and attribute map data of a corresponding pixel must be transferred in correspondence with each other. That is, when the pixel value of a specific pixel in the image memory is transferred to the image processing unit, attribute map data (flag data) of that pixel must also be transferred at substantially the same time.

Figure 5:
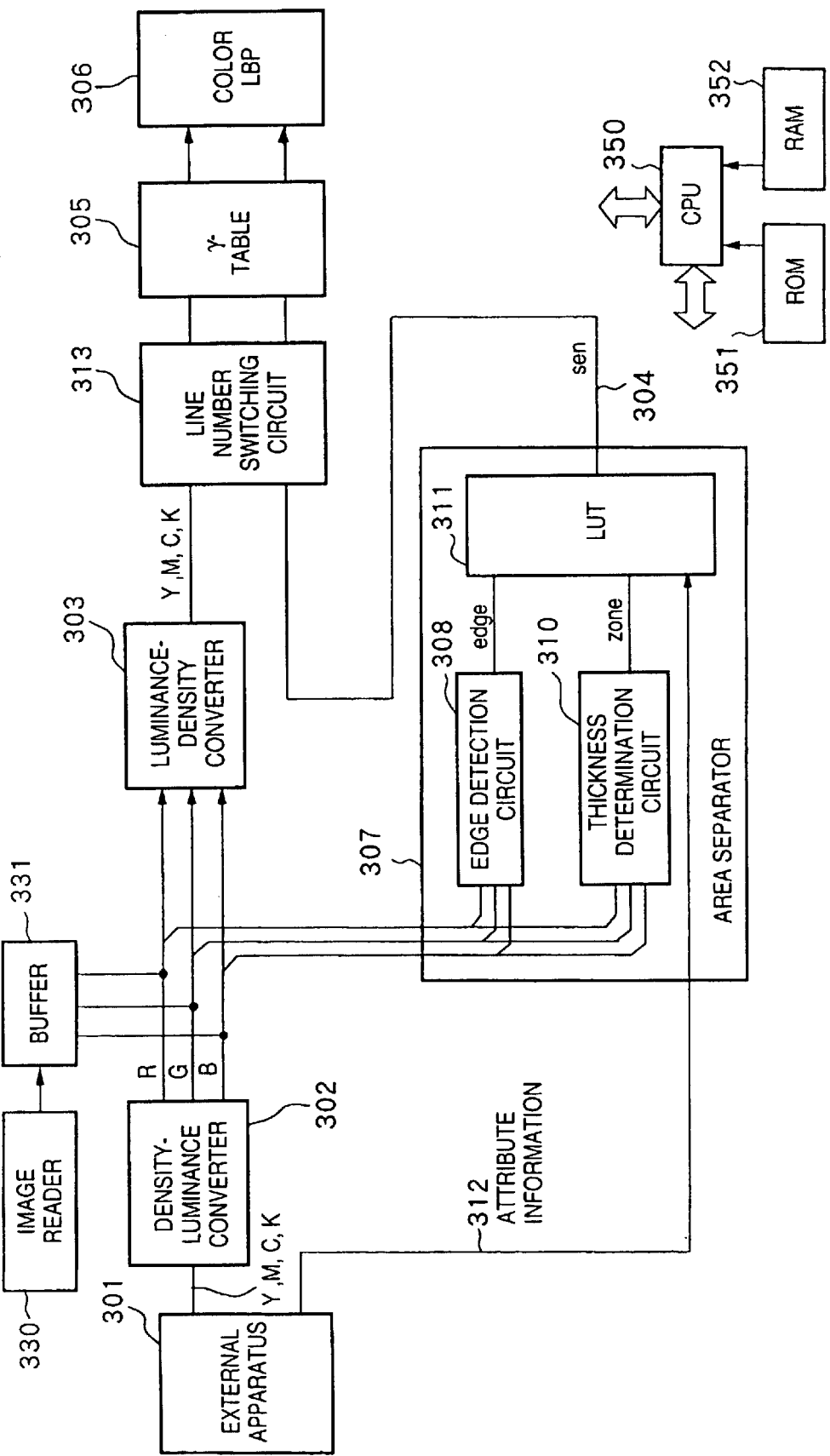
FIG. 5 is a block diagram showing the arrangement of an image processing unit shown in FIG. 1.

The arrangement and operation of the image processing unit 17 in this embodiment will be described in detail below with reference to FIG. 5.

Normal color copy operation will be explained below.

An image reader 330 optically reads an original image, and outputs image (luminance) data (8 bits each) of R, G, and B color components in units of lines. The R, G, and B data as the read luminance components are temporarily stored in a buffer 331, which synchronizes the respective color components R, G, and B (8 bits each), and are pixel-sequentially output.

The input R, G, and B data are converted into density data (one of Y, M, C, and K) by a luminance-density converter 303 (8 bits), and the converted data undergoes image formation for one recording color component by a color LBP 306 via a line number switching circuit 313 and γ table 305.

By reading the original image by the image reader 330 a total of four times, recording color components corresponding to the respective sequences are generated by the luminance-density converter 303, and undergo superposition recording by the color LBP 306. Upon completion of the image formation process of the last recording component, fixing and exhaust procedures are done.

An image area separator 307 performs edge determination and thickness determination (to be described in detail later) on the basis of the input R, G, and B data (8 bits each), and outputs control signals to the line number switching circuit 313, γ conversion table 305, and color LBP 306. Especially, the separator 307 generates a recording resolution (line density) control signal (sen signal) 304 for the color LBP 306.

Figure 18:
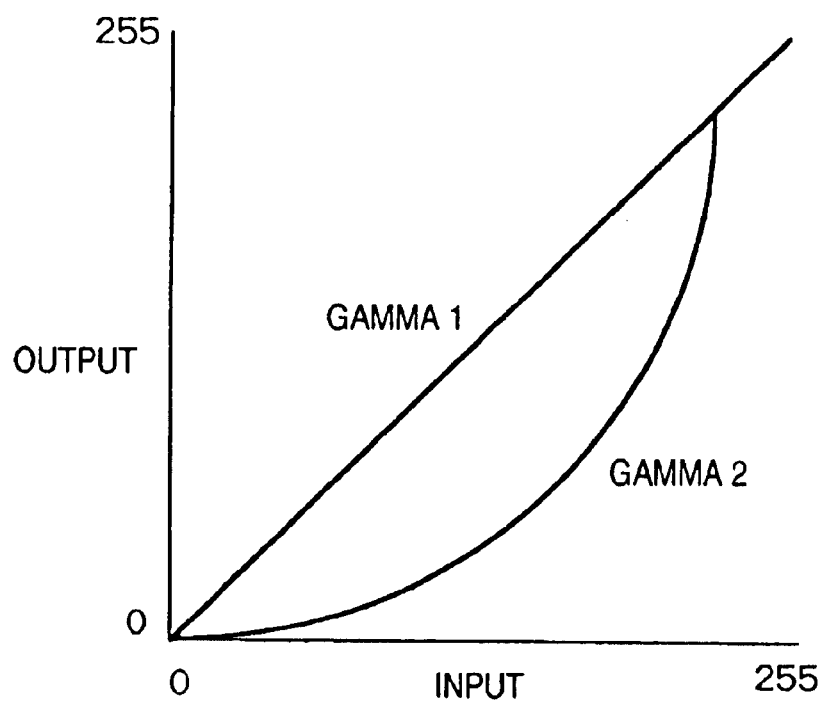
FIG. 18 is a graph for explaining a line number switching table of the embodiment shown in FIG. 1.

The line number switching circuit 313 generates a 400-line/200-line switching signal in accordance with the result from the image area separator 307. In this line number switching, a 400-line signal is alternately multiplied by two different tables shown in FIG. 18 to reproduce 400 lines like 200 lines, thus forming a stable grayscale image. The γ table 305 converts density data (recording color component data) of each resolution in accordance with the tone reproduction characteristics of the color LBP 306. One of the Y, M, C, and K data (image signal), which has undergone the aforementioned processes is sent to the color LBP 306 as the sen signal serving as the 400-line/200-line switching signal, and undergoes image formation by PWM (Pulse Width Modulation) by a printer unit.

Note that the color LBP 306 has output resolutions (lines/inch) of 200 dpi (half the scan resolution) and 400 dpi (equal to the scan resolution) in correspondence with the sen signal. As a basic principle of recording at different resolutions, in this embodiment, a printer engine having a basic resolution of 400 dpi is mounted, and pseudo 200-dpi data is generated by successively outputting one of two scanned pixels twice (i.e., by decimating one pixel) upon recording at 200 dpi. Recording at 400 dpi can be implemented by directly outputting scanned data. Also, other methods may be used. For example, PWM control normally generates a pulse width signal depending on the density by converting pixel data into an analog signal and comparing an analog triangular wave signal and a given voltage level. Upon PWM-modulating certain recording color image data, one of two triangular waves may be selected, and an image is formed based on the selected triangular wave. Note that the two triangular waves have different periods. That is, recording at 200 dpi uses a triangular wave having a period twice that of 400-dpi clocks (½ frequency).

Note that a CPU 350 drives the image reader 330, designates a recording color component to be generated by the luminance-density converter 303, and controls the developing color in the color LBP 306. The CPU 350 executes the aforementioned processes and controls recording of image data received from a host computer (to be described later) in accordance with programs stored in a ROM 351. Reference numeral 352 denotes a RAM which is used as a work area of the CPU 350.

The operation executed when Y, M, C, and K data are frame-sequentially output from an external apparatus 301 (the raster image processor 13 in FIG. 1) will be explained below. That is, a mode in which the color copying machine of this embodiment serves as a printer of the external apparatus 301 or host computer 10 will be explained.

The external apparatus 301 outputs Y, M, C, and K data (8 bits each) frame-sequentially, and also outputs attribute information 312.

As has been described above, image signals Y, M, C, and K output from the external apparatus 301 are frame-sequentially transferred to a density-luminance converter 302. In this case, the CPU 350 outputs an instruction signal to the density-luminance converter 302 and luminance-density converter 303. The density-luminance converter 302 converts one of the received recording color components into R, G, and B data (8 bits each). For example, upon receiving Y-component data of Y, M, C, and K recording color components, the converter 302 generates R, G, and B data (8 bits each) based on the Y-component data. In general, yellow is a complementary color of blue, and upon converting Y data into R, G, and B data, the B component is different from R and G data. However, in this embodiment, R=G=B=255−Y is simply set to reduce the influences of the image area separator 307. The luminance-density converter 303 generates original Y recording component data by a conversion inverse to the aforementioned conversion, thus preparing for image formation of the Y component.

The image area separator 307 will be explained below. As shown in FIG. 5, the image area separator 307 comprises an edge detection circuit 308, character thickness determination circuit 310, and look-up table 311.

Figure 6:
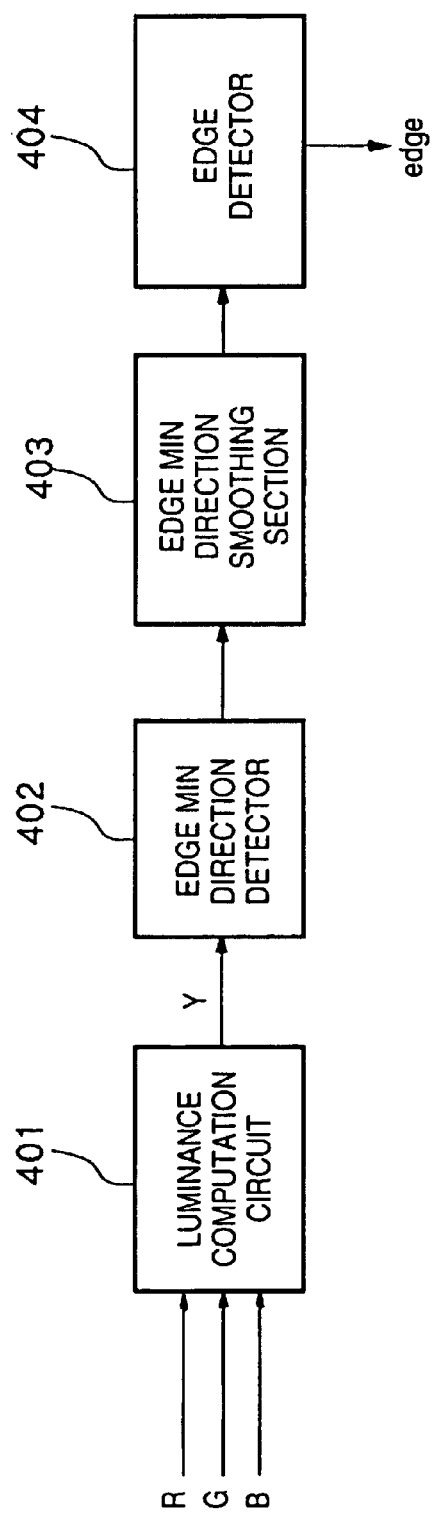
FIG. 6 is a block diagram showing the arrangement of an edge detector shown in FIG. 5.

The edge detection circuit 308 will be described first. FIG. 6 shows the arrangement of the edge detection circuit 308 in this embodiment.

A luminance computation circuit 401 computes a luminance signal Y based on input R, G, and B data (8 bits each) by:

$$Y=0.25R+0.5G+0.25B \quad (1)$$

Figure 7:
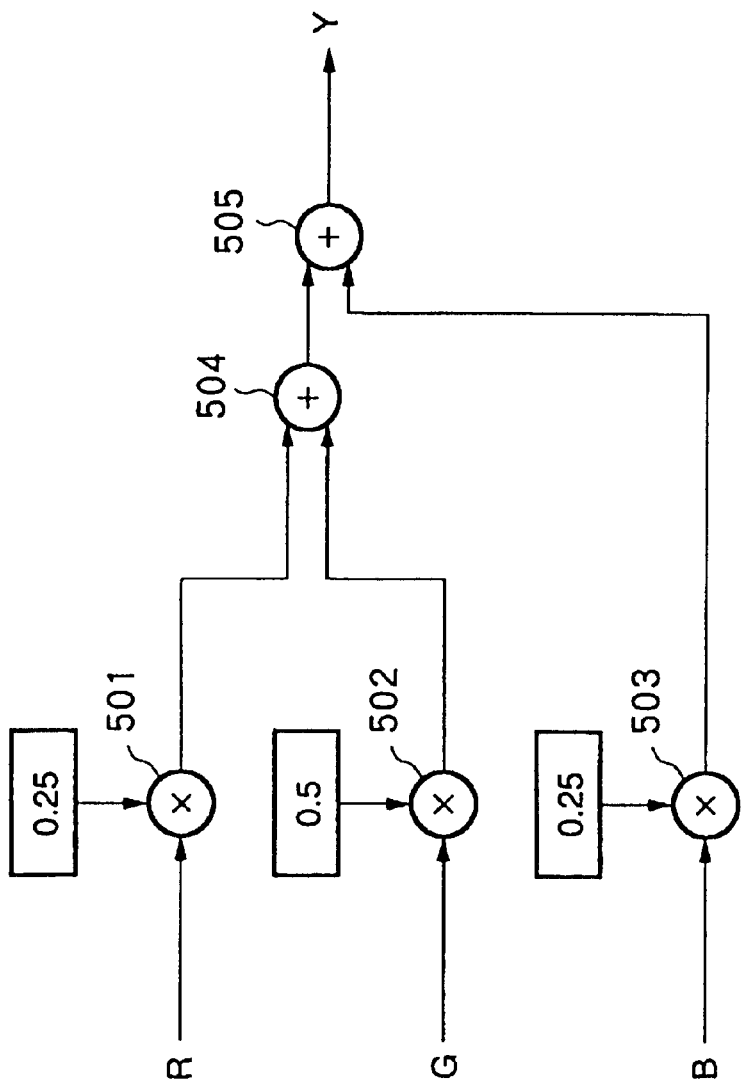
FIG. 7 is a block diagram showing the arrangement of a luminance computation circuit shown in FIG. 6.

FIG. 7 shows the detailed arrangement of the luminance computation circuit 401. Color signals R, G, and B input in FIG. 5 are respectively multiplied by coefficients 0.25, 0.5, and 0.25 by multipliers 501, 502, and 503, and the products are added by adders 504 and 505, thus computing the luminance signal Y according to equation (1) above.

Figure 8:
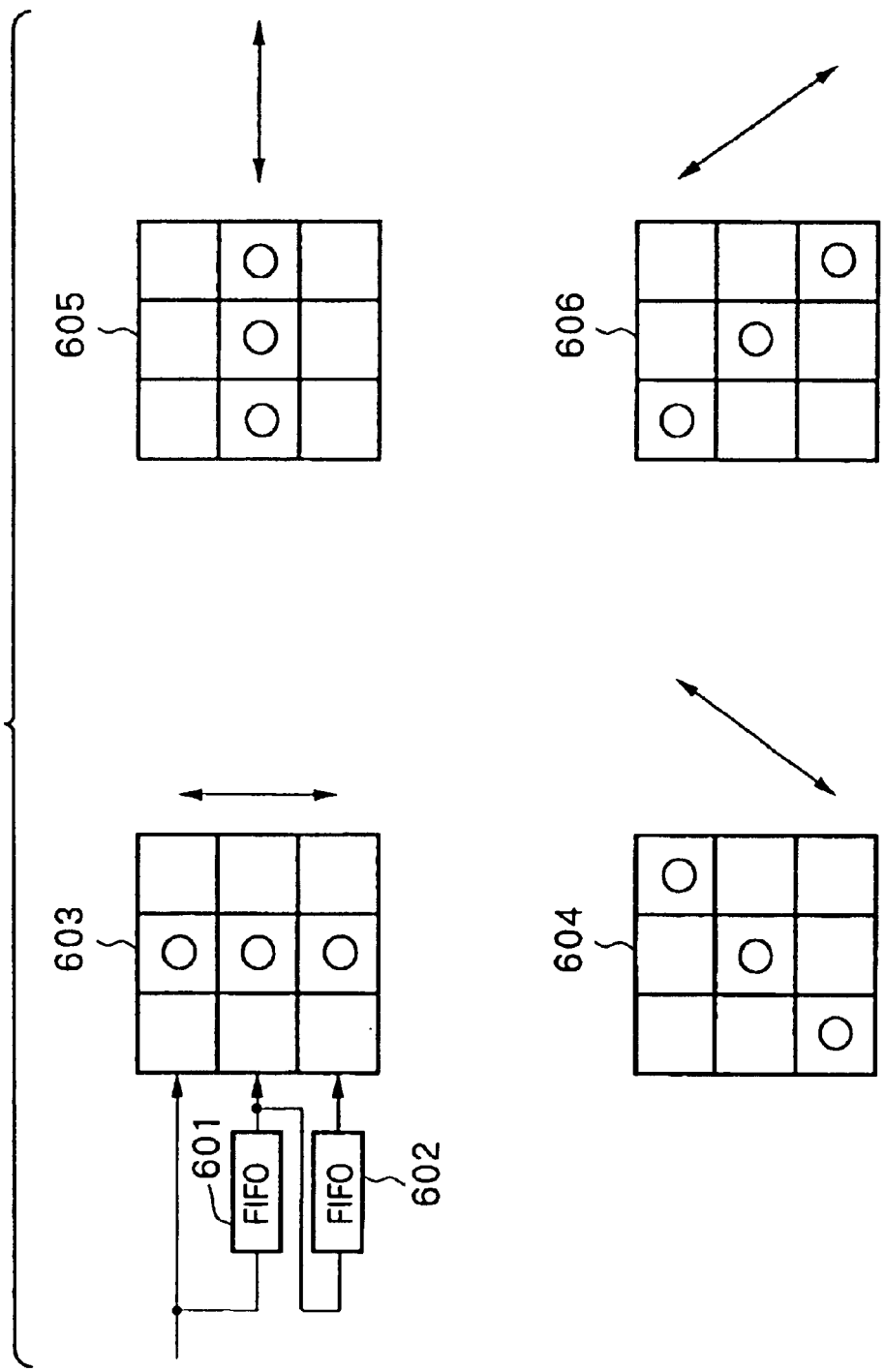
FIG. 8 is a diagram showing the arrangement of an edge MIN direction detector shown in FIG. 6.

The computed luminance signal Y is input to an edge MIN direction detector 402 to detect a direction in which the edge is minimized. FIG. 8 shows details of the edge MIN direction detector 402.

Referring to FIG. 8, input data is delayed one line by each of FIFO memories 601 and 602 to generate data for three lines, and a direction in which a change in luminance is largest is detected from 3×3 blocks. In this embodiment, one of lines indicated by circular marks in blocks 603 to 606, which corresponds to the largest change in luminance, is detected, and a direction perpendicular to the detected direction is output as an edge Min signal. That is, when it is determined that a change in luminance in the line indicated by the circular marks in the blocks 603 is larger than other blocks 604 to 606, since the line referred to by the blocks is the vertical direction, a direction perpendicular to the vertical direction (the horizontal direction in this case) is output as an edge Min direction. The edge Min direction is one of four different directions, i.e., vertical, horizontal, and two oblique directions. However, when the detected maximum rate of change in luminance is equal to or smaller than a predetermined value, i.e., the luminance has little change, or when an identical maximum change in luminance is detected at a plurality of positions, information indicating that no edge Min direction is detected from the blocks of interest (3×3 blocks) is output. Hence, since the edge Min signal can assume one of five different values, it can be expressed by values 0 to 4, i.e., 3 bits. In this embodiment, "0" is used as information indicating the absence of edge, and "1" to "4" are respectively used as information indicating the corresponding edge Min directions (vertical, horizontal, and two oblique directions).

An edge Min direction smoothing section 403 receives the edge Min signal, and delays it using six FIFO memories to generate data for a total of seven lines, i.e., no delay, delayed one line, . . . , delayed six lines. An edge detector 404 determines the edge Min direction at the position of the pixel of interest on the basis of the edge Min value at the position of the pixel of interest, and 3×3 blocks, 5×5 blocks, and 7×7 blocks around the pixel of interest, and outputs the determined direction as an edge signal (3 bits).

More specifically, when the edge Min value at the position of the pixel of interest is "0", i.e., the edge Min direction cannot be specified, it is expanded up to 3×3 block, the frequencies of occurrence of values except for "0" are detected, and when the maximum frequency of occurrence of the edge Min value is in the majority, it is determined as the edge direction at the position of the pixel of interest. For example, when the edge Min value corresponding to the maximum frequency of occurrence in 3×3 pixel blocks is "1", and its frequency of occurrence is "5", since it is in the majority, that value is output as the edge signal. If the maximum frequency of occurrence is not in the majority, determination using the 3×3 blocks is given up, and similar determination is made using 5×5 blocks. If the edge direction cannot be determined even using the 5×5 blocks, determination is made using 7×7 blocks. If the edge direction cannot be determined even using 7×7 blocks, it is determined that no edge is present at the position of the pixel of interest, and a value "0" is output as the edge signal.

The character thickness determination circuit 310 in FIG. 5 will be explained below.

Figure 11:
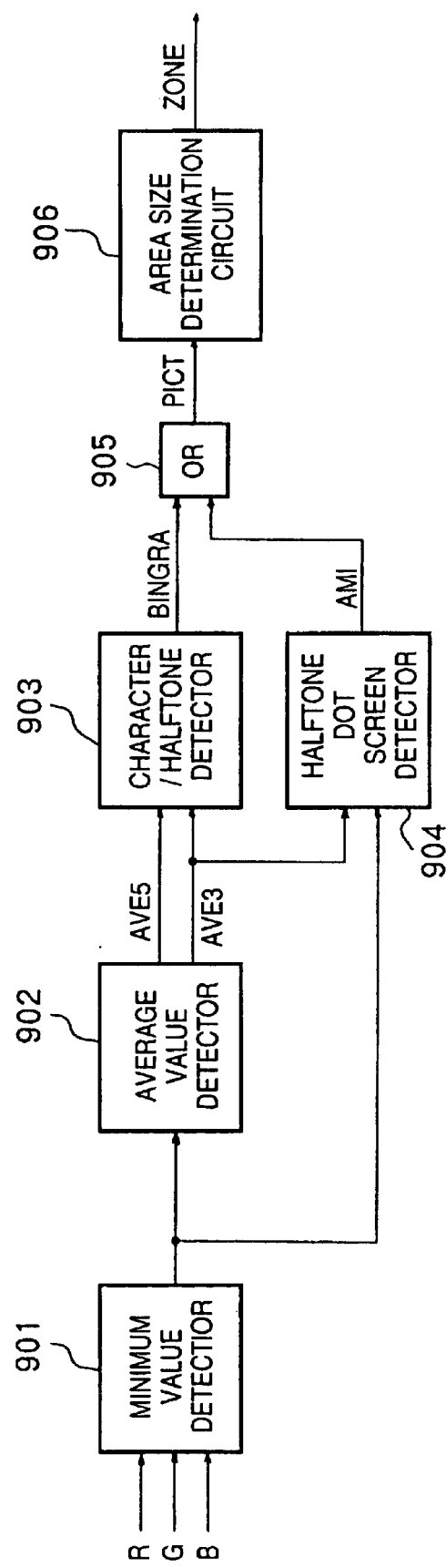
FIG. 11 is a block diagram showing the arrangement of a thickness determination circuit shown in FIG. 5.

FIG. 11 is a block diagram for explaining the character thickness determination circuit 310.

Color signals R, G, and B are input to a minimum value detector 901. The minimum value detector 901 obtains a minimum value MINRGB of the input R, G, and B signals. The minimum value MINRGB is input to an average value detector 902 to compute an average value AVE5 of MINRGB of 5 pixels×5 pixels around the pixel of interest, and an average value AVE3 of MINRGB of 3 pixels×3 pixels around the pixel of interest.

The values AVE5 and AVE3 are input to a character/halftone detection circuit (character/halftone area detection circuit or character/halftone detector) 903. The character/halftone area detection circuit 903 detects the density of the pixel of interest and the change amount between the pixel of interest and the average density of surrounding pixels in units of pixels, thus checking if the pixel of interest is a part of a character or halftone area.

Figure 20:
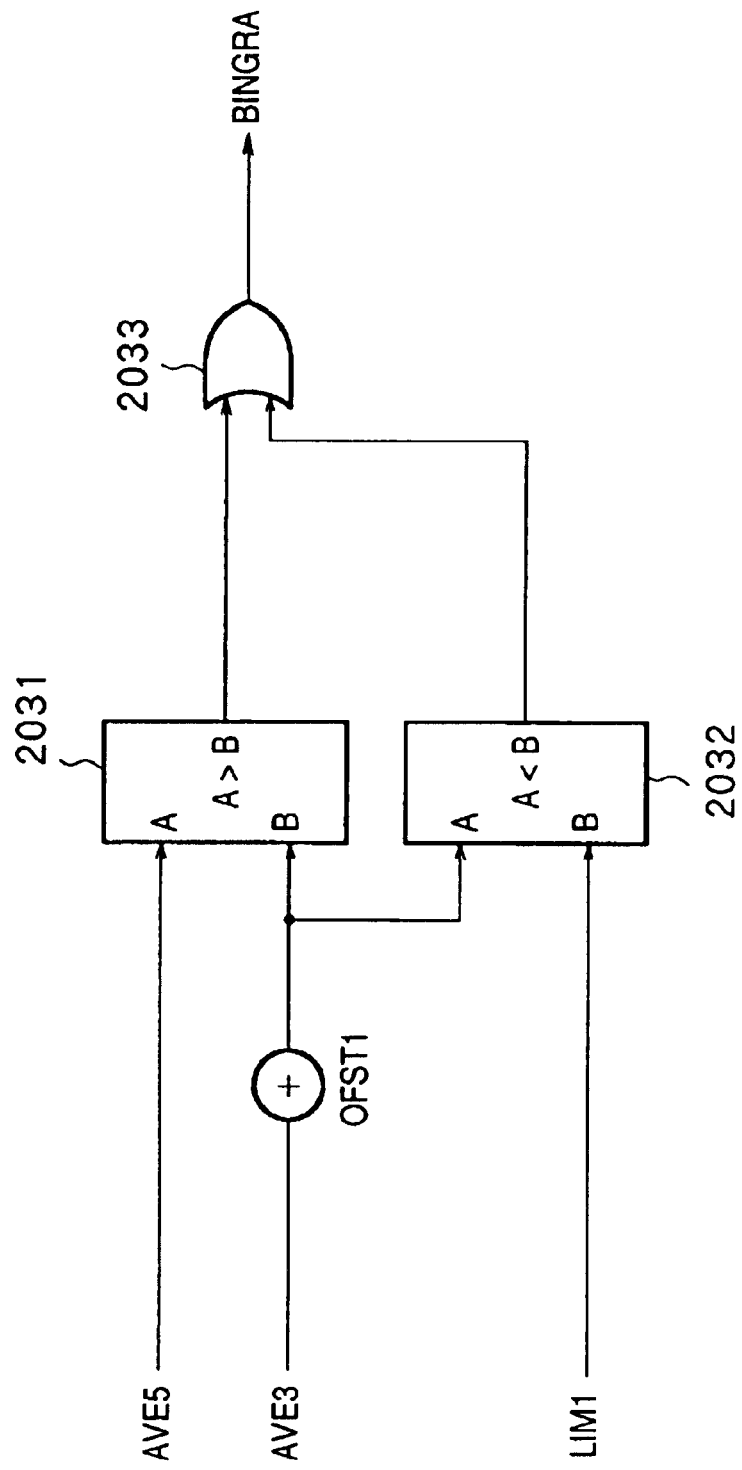
FIG. 20 is a block diagram showing the arrangement of a character/halftone area detection circuit in the embodiment shown in FIG. 1.

FIG. 20 shows the character/halftone area detection circuit 903. In the character/halftone area detection circuit, an appropriate offset value OFST1 is added to AVE3, and the sum is compared with AVE5 by a comparator 2031. Also, the sum is compared with an appropriate limit value LIM1 by a comparator 2032. The output values from these comparators are input to an OR gate 2033, and an output signal BINGRA from the OR gate 2033 goes HIGH when:

$$AVE3+OFST1<AVE5 \quad (2)$$

or $$AVE3+OFST1<LIM1 \quad (3)$$

That is, when this circuit detects that a change in density is present in the vicinity of the pixel of interest (character edge portion) or pixels near the pixel of interest have density equal to or larger than a given value (inside a character or a halftone portion), the character/halftone area signal BINGRA goes HIGH.

A halftone dot screen area detection circuit (halftone dot screen area detector) 904 detects a halftone dot screen area.

Figure 21:
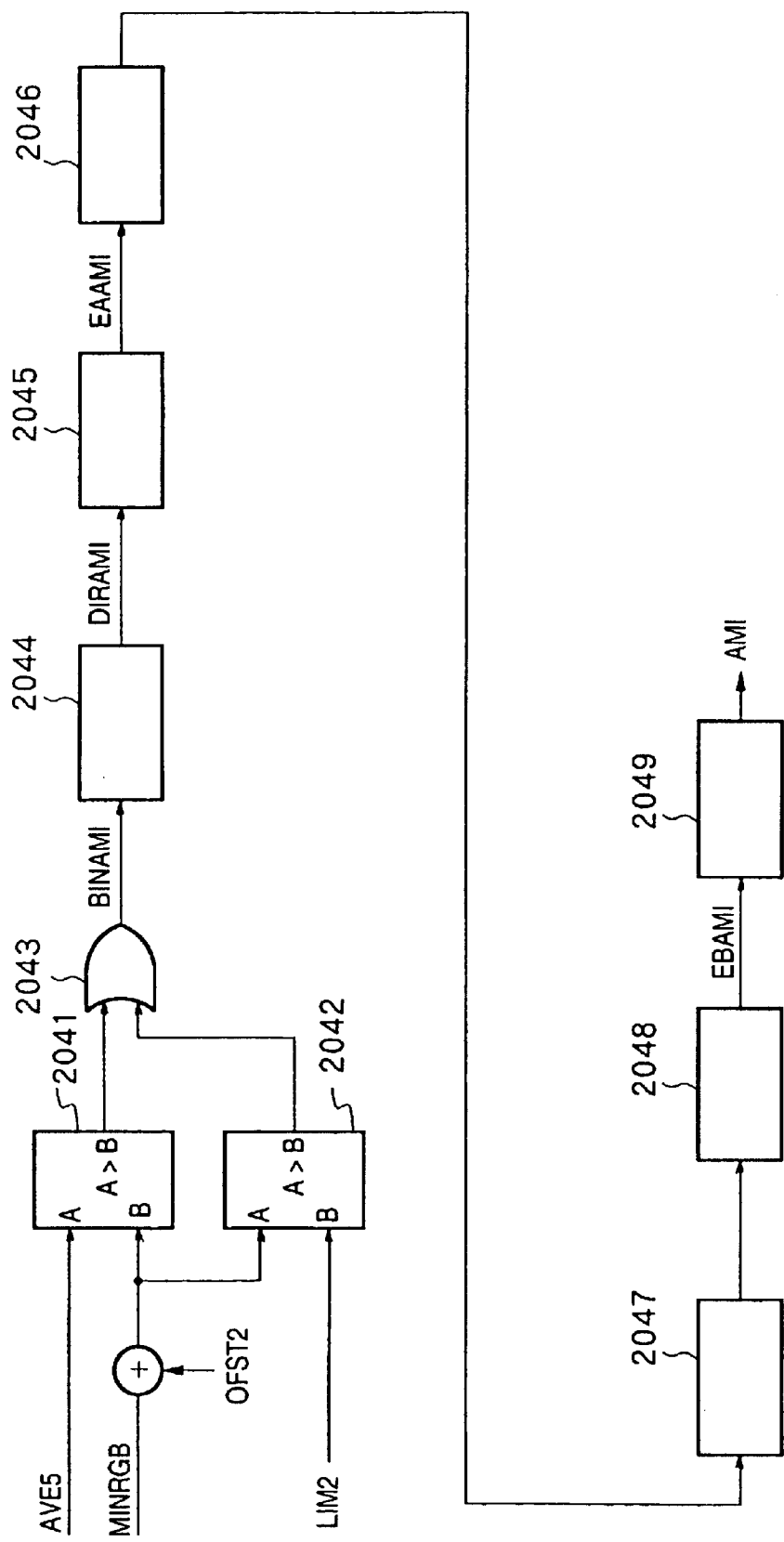
FIG. 21 is a block diagram showing the arrangement of a halftone dot screen area detection circuit.

FIG. 21 shows the halftone dot screen area detection circuit 904. An appropriate offset value OFST2 is added to MIN-RGB detected by the minimum value detection circuit (detector) 901, and the sum is compared with AVE5 by a comparator 2041. Also, the sum is compared with an appropriate limit value LIM2 by a comparator 2042. The output values from these comparators are input to an OR gate 2043, and an output signal BIMAMI from the OR gate 2043 goes HIGH when:

$$MINRGB+OFST2<AVE5 \quad (4)$$

or $$MINRGB+OFST2<LIM2 \quad (5)$$

Then, an edge direction detection circuit 2044 detects edge directions in units of pixels using the signal BIMAMI.

Figure 22:
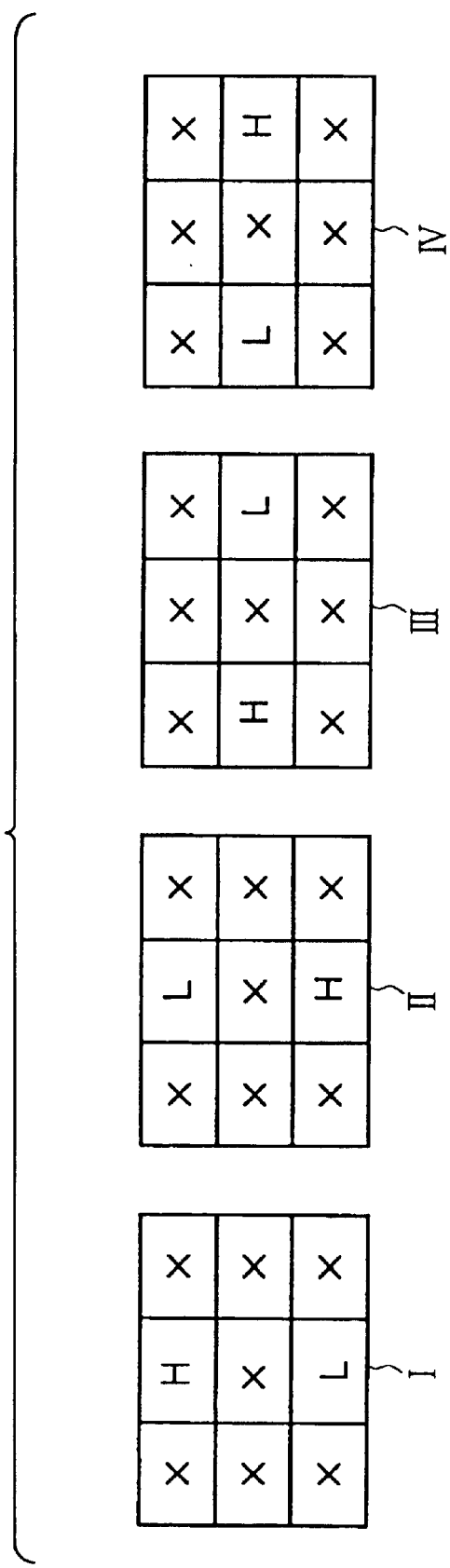
FIG. 22 is a view for explaining edge direction detection rules of the embodiment shown in FIG. 1.

FIG. 22 shows edge direction detection rules in the edge direction detection circuit. When eight pixels around the pixel of interest satisfy one of conditions (I) to (IV) in FIG. 22, one of bits 0 to 3 of an edge direction signal DIRAMI goes HIGH.

Furthermore, the next counter edge detection circuit 2045 detects counter edges in a 5×5 (pixel) area that surrounds the pixel of interest. In a coordinate system which has the signal DIRAMI of the pixel of interest as A33 shown in FIG. 23, the following counter edge detection rules are used:

(1) bit 0 of at least one of A11, A21, A31, A41, A51, A22, A32, A42, and A33 is HIGH, and
bit 1 of at least one of A33, A24, A34, A44, A15, A25, A35, A45, and A55 is HIGH;

(2) bit 1 of at least one of A11, A21, A31, A41, A51, A22, A32, A42, and A33 is HIGH, and
bit 0 of at least one of A33, A24, A34, A44, A15, A25, A35, A45, and A55 is HIGH;

(3) bit 2 of at least one of A11, A12, A13, A14, A15, A22, A23, A24, and A33 is HIGH, and
bit 3 of at least one of A33, A42, A43, A44, A51, A52, A53, A54, and A55 is HIGH; or (4) bit 3 of at least one of A11, A12, A13, A14, A15, A22, A23, A24, and A33 is HIGH, and
bit 2 of at least one of A33, A42, A43, A44, A51, A52, A53, A54, and A55 is HIGH.

If one of conditions (1) to (4) is satisfied, a signal EAAMI is set at HIGH. That is, when the counter edge detection circuit 2045 detects counter edges, a counter edge signal EAAMI goes HIGH.

Next, an expansion circuit 2046 expands the signal EAAMI to 3 pixels×4 pixels, and if a pixel with EAAMI= HIGH is included in the 3 pixels×4 pixels near the pixel of interest, the signal EAAMI of the pixel of interest is replaced by HIGH. Furthermore, using a contraction circuit 2047 and expansion circuit 2048, an isolated detection result in 5 pixels×5 pixels is removed to obtain an output signal EBAMI. Note that the expansion circuit outputs HIGH if one of pixels in a given area is HIGH, and is constructed by OR gates. Also, the contraction circuit outputs HIGH only when all the input signals are HIGH, and is constructed by AND gates.

Finally, a counter 2049 counts the number of pixels corresponding to the output signal EBAMI=HIGH from the expansion circuit 2048 within a window having an appropriate size. In this embodiment, a 5×64 (pixel) area including the pixel of interest is referred to. With the aforementioned processes of the halftone dot screen area detection circuit 904, a halftone dot screen image detected as a set of isolated points by the signals BINGRA can be detected as an area signal.

The character/halftone area signal BINGRA and halftone dot screen area signal AMI detected by the aforementioned process are input to and ORed by an OR gate 905, thus generating a binary signal PICT of an input image.

The signal PICT is input to an area size determination circuit 906 to determine the area size of the binary signal.

Figure 24:
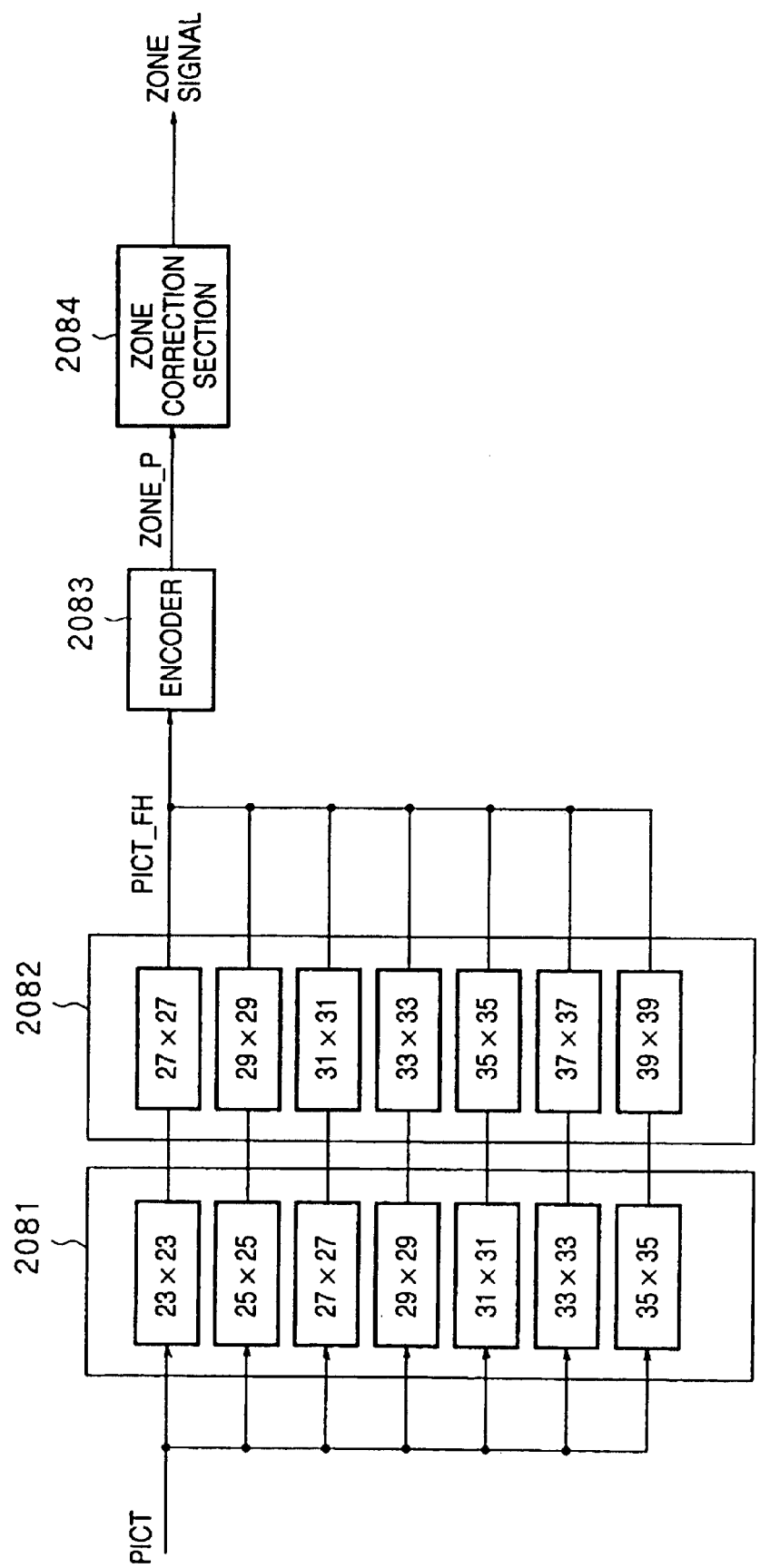
FIG. 24 is a block diagram for explaining an area size determination circuit of the embodiment shown in FIG. 1.

FIG. 24 shows the area size determination circuit. This circuit includes a plurality of pairs of contraction circuits 2081 and expansion circuits 2082, which respectively refer to areas of different sizes. The signal PICT is delayed some lines in correspondence with the size of the contraction circuits, and the delayed signals are then input to the contraction circuits 2081. In this embodiment, seven different contraction circuits having sizes ranging from 23 pixels× 23 pixels to 35 pixels×35 pixels are prepared. Signals output from the contraction circuits 2081 are input to the expansion circuits 2082 after being line-delayed. In this embodiment, seven different expansion circuits having sizes ranging from 27 pixels×27 pixels to 39 pixels×39 pixels are prepared in correspondence with the outputs from the contraction circuits shown in FIG. 24, so as to obtain output signals PICT_FH from the individual expansion circuits.

Figure 25:
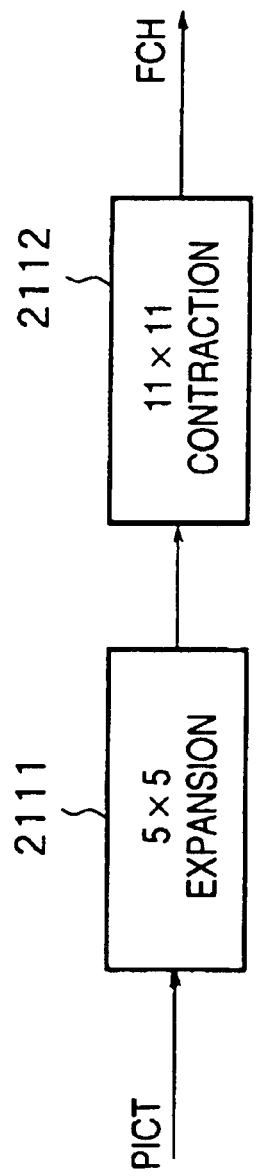
FIG. 25 is a block diagram showing the arrangement for character detection in the embodiment shown in FIG. 1.

The output signals PICT_FH are determined by the thickness of a character when the pixel of interest is a part of the character. These output signals PICT_FH are input to an encoder 2083, thus obtaining an image area signal ZONE_P to which the pixel of interest belongs. In this embodiment, the signal ZONE is expressed by 3 bits to express the thickness of a character in eight levels. The thinnest character is expressed by "0", and the thickest character (including an area other than the character) is expressed by "7". FIG. 25 shows the algorithm for character detection in the halftone dot screen/halftone area. The above-mentioned signal PICT undergoes an expansion process using 5×5 blocks in an expansion circuit 2111. With this process, the detected halftone dot screen area, which is likely to be an incomplete detection result, is corrected. Then, the output signal from the circuit 2111 undergoes a contraction process using 11×11 blocks in a contraction circuit 2112. A signal FCH obtained by these processes is contracted by 3 pixels with respect to the signal PICT (Zone Correction Section 2084).

The LUT 311 shown in FIG. 5 will be explained below.

The color printer can execute an optimal process for a PDL image on the basis of the signals determined by the edge detection circuit 308 and character thickness determination circuit 310, and the attribute information 312 input from the external apparatus 301.

As characteristic features of the table, a multi-valued black character process can be done in correspondence with the thickness of a character;

since a plurality of edge area ranges are prepared, a black character process area can be selected in correspondence with the thickness of a character;

a process is done while distinguishing a character in a halftone dot screen/halftone area from that in a white background; and the resolution of the printer is changed for only the thinnest character.

The present invention is not limited to the aforementioned processes of this embodiment, and the input signal can undergo a various combinations of processes.

However, depending on image data output from a controller, e.g., for a CG (computer graphics) image, the aforementioned problem is posed. That is, determination errors often become more conspicuous than a natural image. This is caused by a noise-less, uniform image and sharp edges unique to the CG image.

Figure 9:
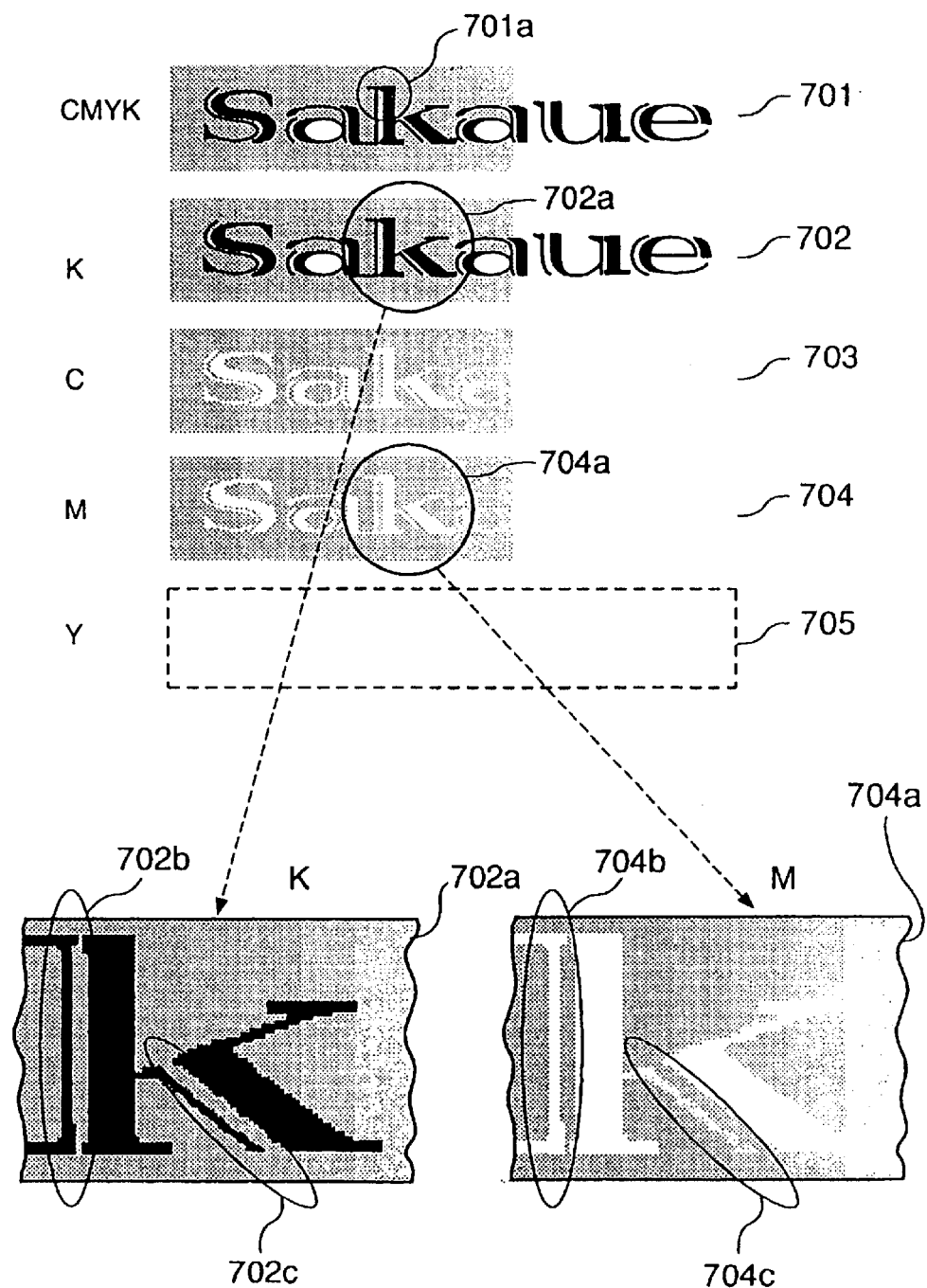
FIG. 9 is a view for explaining the operation in the embodiment shown in FIG. 1.

For example, an image 701 formed by Y, M, C, and K signals, as shown in FIG. 9 will be examined. This image is created by the computer, and the background of black characters is expressed by moderate gradation. For the sake of simplicity, assume that a black portion has a high signal level, and a white portion has a low signal level. When this image is divided into signal planes, images of a K plane (702), C plane (703), M plane (704), and Y plane (705) are obtained. In the image 702, the character portions have a high signal level, and the background has a low signal level. In the image 703, the character portions have zero signal level, and the background has a low signal level. In the image 704, the character portions have zero signal level, and the background has a low signal level. In the image 705, both the character and background options have zero signal levels.

When such image is output by the color printer 107, since determination and processes are done in units of planes, different determination and process results may be obtained in units of planes. As a result, nonuniformity is produced, thus deteriorating the image quality.

For example, in a portion 702*a* of the image 702, the character portion is normally determined to be a character portion, and undergoes a process for a character. The background is determined to be a non-character portion, and undergoes a process for a photo. In this case, the process for a character means outputting an image at a resolution of 400 lines. The process for a photo indicates a process for alternately multiplying a 400-line signal by two different tables shown in FIG. 18 to obtain a stabler tone output. In this case, this process will be referred to as a 200-line process hereinafter for the sake of simplicity. That is, in the image portion 702*a*, the character portion undergoes the 400-line process, and the background undergoes the 200-line process. However, in a portion 704*a* of the image 704, some background portions 704*b*, 704*c*, and the like undergo the character process by the aforementioned image area separator 307. As a result, some background portions undergo the 400-line process, and some other background portions undergo the 200-line process.

Upon comparison between the K and M planes, portions 702*b* and 702*c* undergo the 200-line process, while portions 704*b* and 704*c* undergo the 400-line process, i.e., different processes are done in units of planes. As a result, since an identical portion undergoes different processes in units of planes, nonuniformity is processed. In practice, since an image is defined by four planes, the probability of producing nonuniformity increases.

Hence, in this embodiment, in order to prevent such nonuniformity from being produced, when the apparatus of this embodiment operates in the printer mode, different line-number processes are inhibited from being mixed on the basis of the attribute information 312, thus suppressing production of nonuniformity. More specifically, the output signal edge from the edge detection circuit 308, and the signal zone from the character thickness determination circuit 310 are invalidated, and the processes are done according to the attribute information. In this case, the signal zone from the character thickness determination circuit 310 may be valid. For example, when the signal zone indicates a line image thinner than a given value, and the attribute information indicates a character line image, since the formed image tends to have a lower density, the density or the number of lines may be increased.

Figure 10:
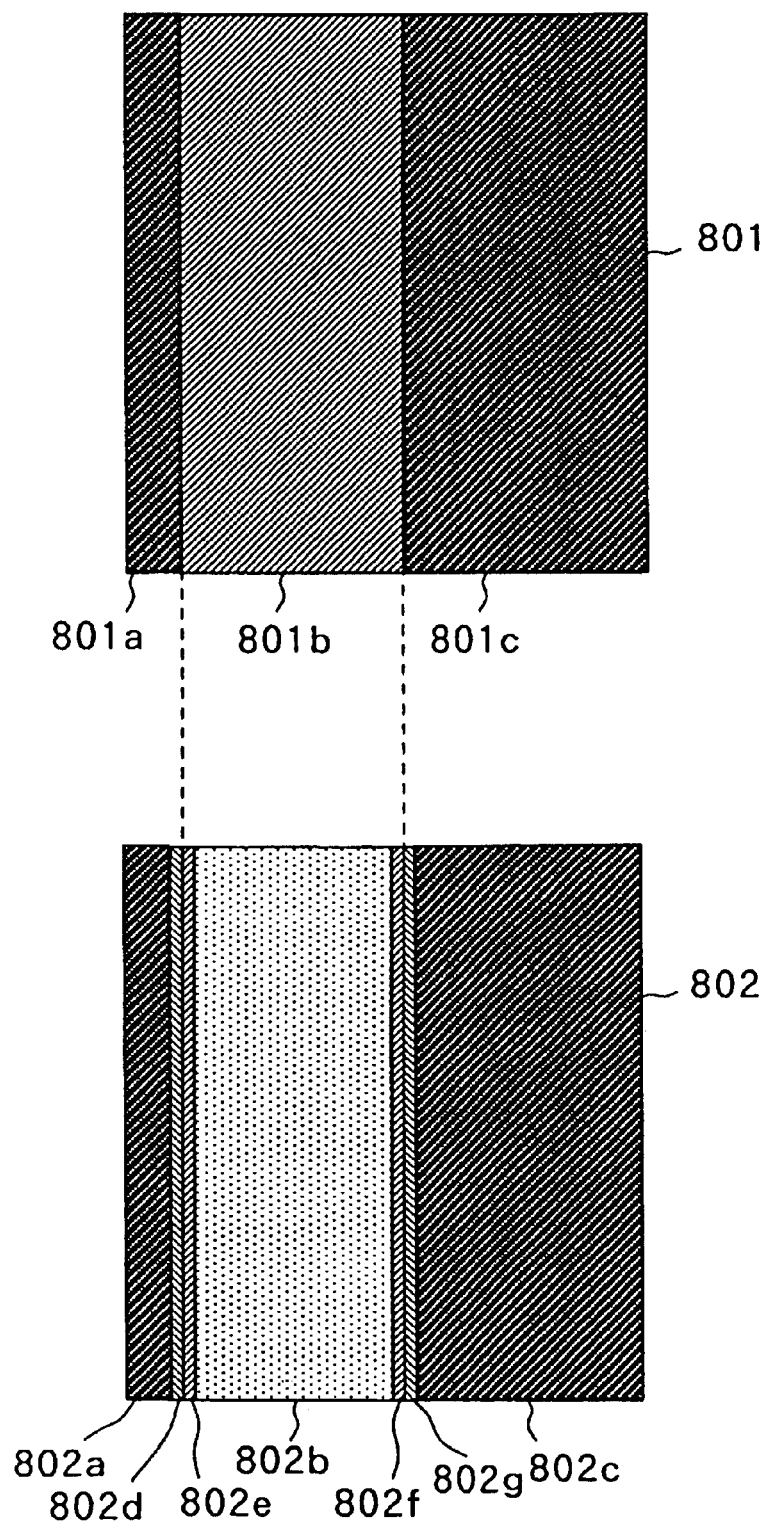
FIG. 10 is a view for explaining the processing operation of an edge portion by the apparatus of the embodiment shown in FIG. 1.

A portion 801 in FIG. 10 corresponds to an enlarged image of a portion 701*a*. In FIG. 10, portions 801*a* and 801*c* correspond to character portions, and a portion 801*b* corresponds to a background. As described above, the portions 801*a* and 801*c* undergo the 400-line process, but the portion 801*b* undergoes both the 400- and 200-line processes depending on planes, thus producing nonuniformity. For this reason, of a portion determined to be a character, only the edge boundary portion undergoes the 400-line process to reduce mixed portions as much as possible. Especially, since a CG image has a sharp edge, and such edge is clearly detected, this method is very effective.

This process will be explained below using an image 802. Areas which are to undergo the 400-line processes are only edge boundary portions, i.e., a portion 802*d* of the portion 801*a*, portions 802*e* and 802*f* of the portion 801*b*, and a portion 802*g* of the portion 801*c*. Other portions 802*a*, 802*b*, and 802*c* undergo the 200-line process. In this manner, portions that undergo both the 400- and 200-line processes in the K and M planes are only the portion 802*e* and 802*f*, thus greatly reducing nonuniformity. The interior of the character portion undergoes the 200-line process. However, since the 200-line process of this embodiment uses the table shown in FIG. 18, and reproducibility as high as that of the 400-line process can be maintained in a high-density portion, no problem is posed. Also, since the edge portion undergoes the 400-line process as in the prior art, reproducibility of the character can be prevented from impairing.

As described above, since only the edge boundary portion undergoes a high-resolution process, different resolution processes in units of planes can be prevented and, as a result, nonuniformity can be reduced.

[Second Embodiment]

In the above embodiment, character and photo images are processed by switching the 400-line/200-line processes, and the character is output at a higher resolution (400 lines), thus improving the character quality. A character portion which is determined using at least one of the attribute map and the image area separation result may use a higher resolution, and may undergo a smoothing process using interpolation, thus improving character reproducibility. Although the basic arrangement is the same as that of the above embodiment, an interpolation process is added to the line number switching unit.

Figure 19:
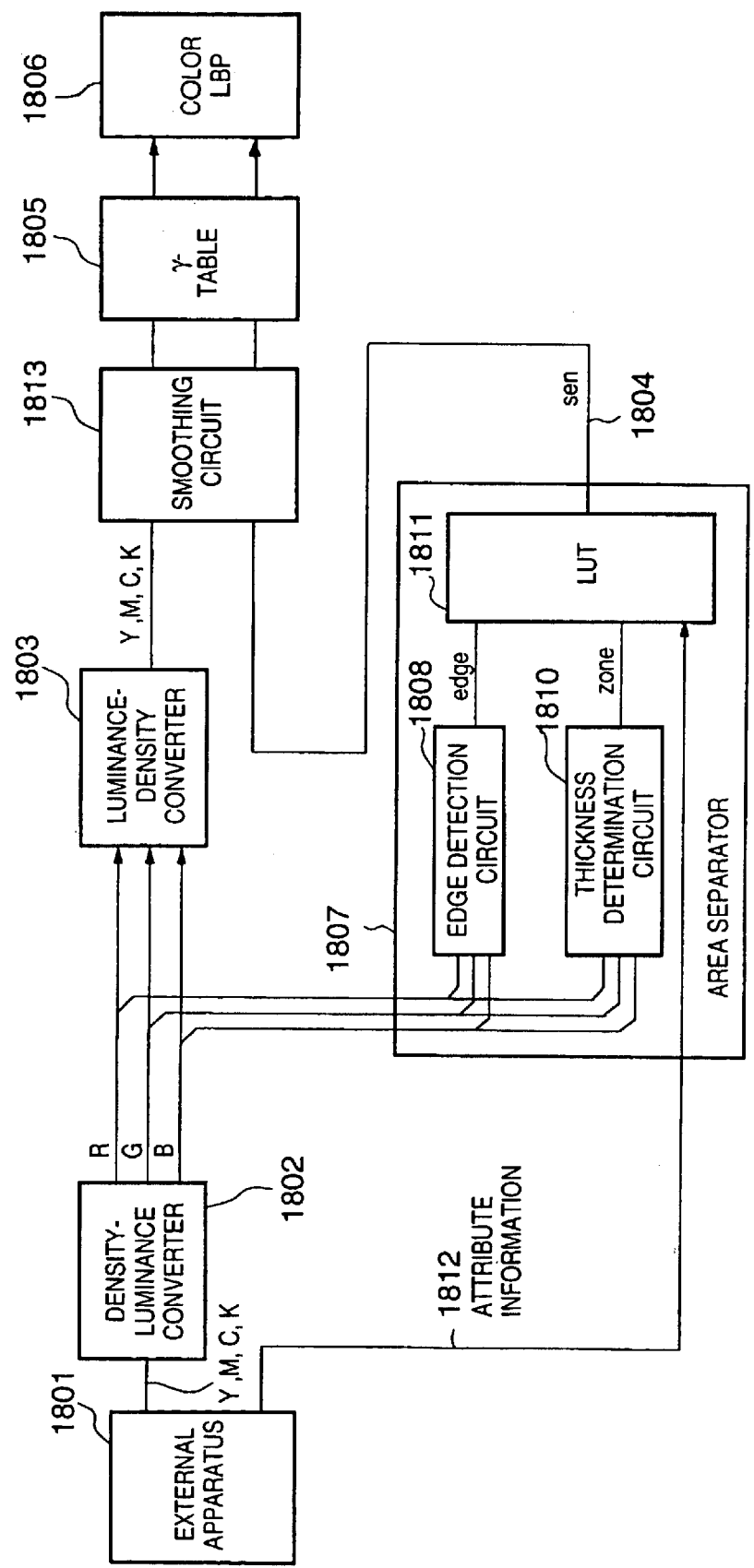
FIG. 19 is a block diagram showing the arrangement of an image processing unit of the second embodiment.

FIG. 19 is a block diagram for explaining the image processing unit of this embodiment. A smoothing circuit 1813 generates data having a resolution twice the scan resolution in accordance with at least one of the attribute map data and image area separation result described in the first embodiment and a 400-line/800-line switching signal, as will be described in detail later. A γ table 1805 converts density data of each resolution in correspondence with tone reproduction characteristics of the printer. The processed Y, M, C, and K frame-sequential image signals which have undergone the above processes, and a sen signal as a 400-line/800-line switching signal are sent to a laser driver, and a printer unit executes density recording using PWM. Also, after a 400-line signal is alternately multiplied by two different tables shown in FIG. 18, the printer unit may execute density recording using PWM. In this manner, 400-line PWM is implemented like 200-line PWM, thus forming a stable grayscale image.

The smoothing circuit 1813 will be explained below.

Figure 12:
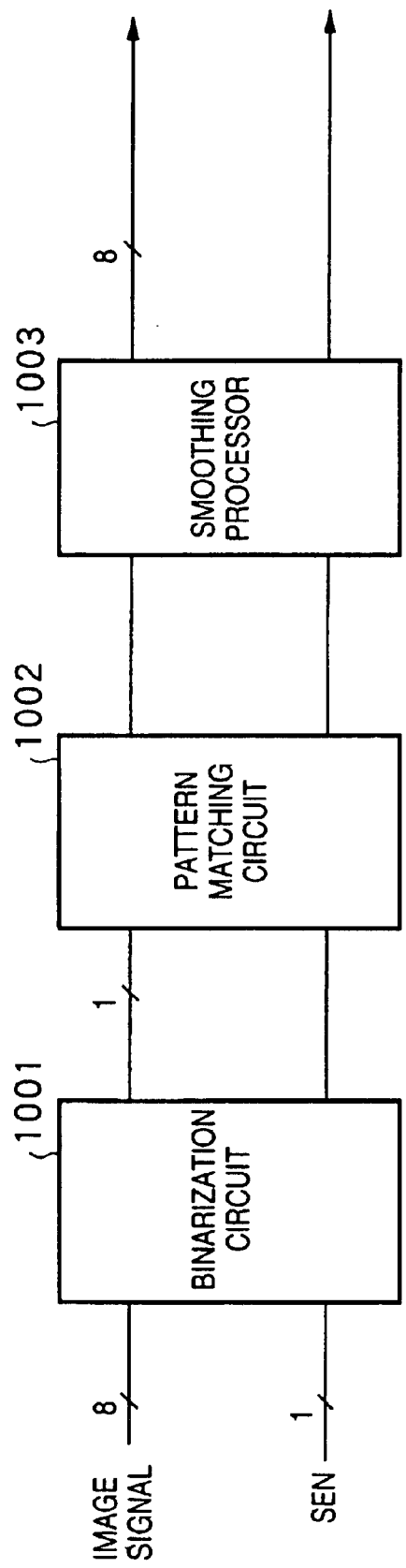
FIG. 12 is a block diagram showing the arrangement of a smoothing circuit according to the second embodiment of the present invention.

FIG. 12 is a block diagram showing details of the smoothing circuit 1813. Y, M, C, and K color signals as input image signals are frame-sequentially transferred, and are binarized by a binarization circuit 1101 for the purpose of pattern matching later. Based on the binary signal, a pattern matching circuit 1102 executes pattern matching. A smoothing circuit 1103 smoothes shaggy patterns using data at a double resolution. Note that data to be interpolated (replaced) is determined by checking density data of surrounding pixels.

Figure 13:
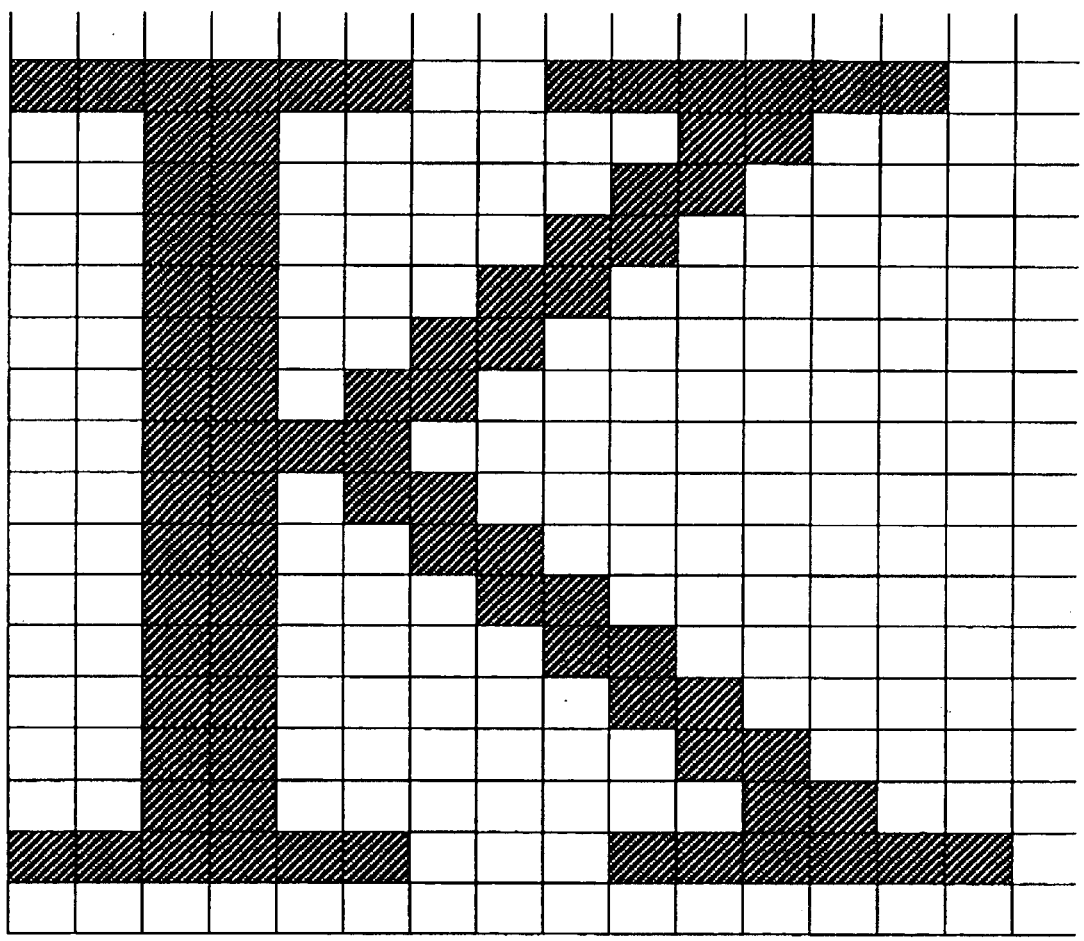
FIG. 13 is a view for explaining a smoothing process in the second embodiment.
Figure 14:
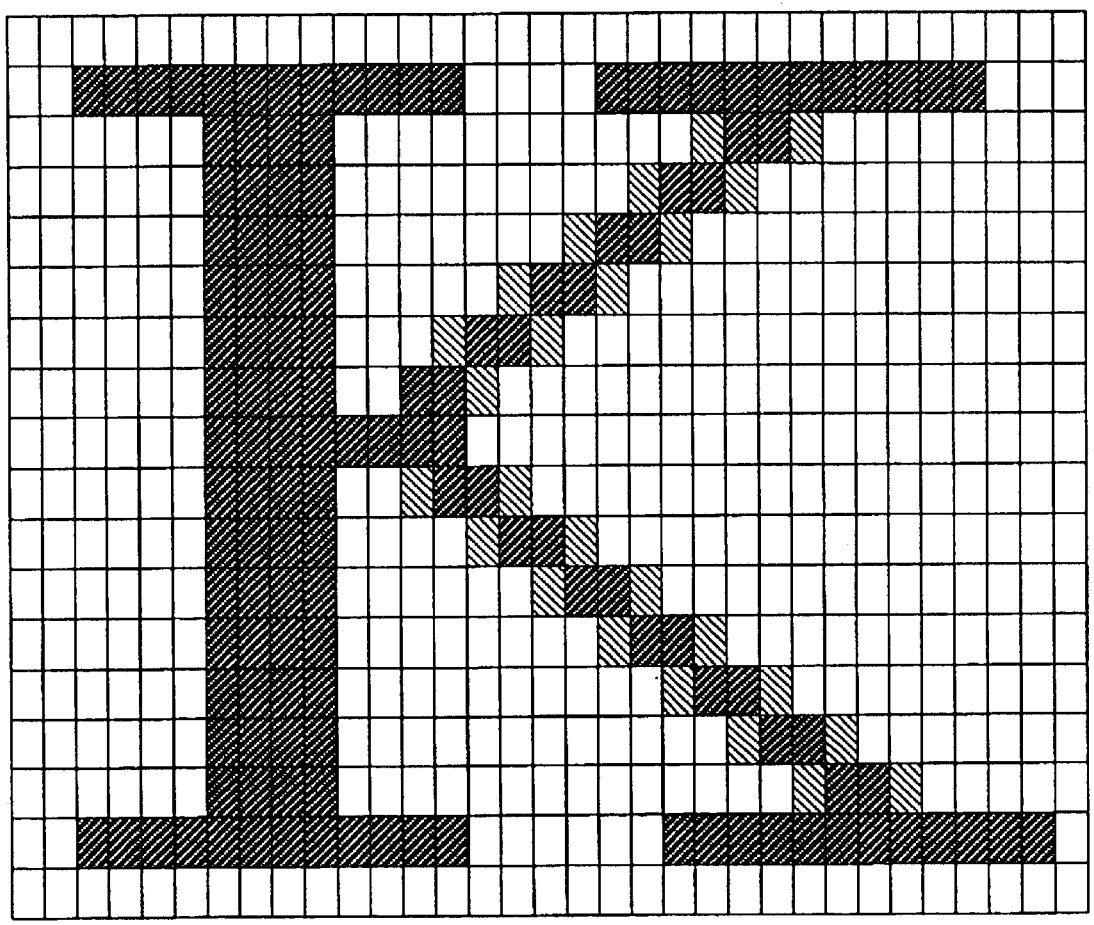
FIG. 14 is a view for explaining a smoothing process in the second embodiment.

FIG. 14 shows a smoothing result of an actual input image shown in FIG. 13. As the portion to be smoothed, only an edge portion is processed on the basis of the image area separation result and attribute map information. Details of the respective circuits will be explained below. In the binarization circuit 1101, an input multi-valued image is binarized by ORing in units of bits by an OR gate (not shown).

Figure 15:
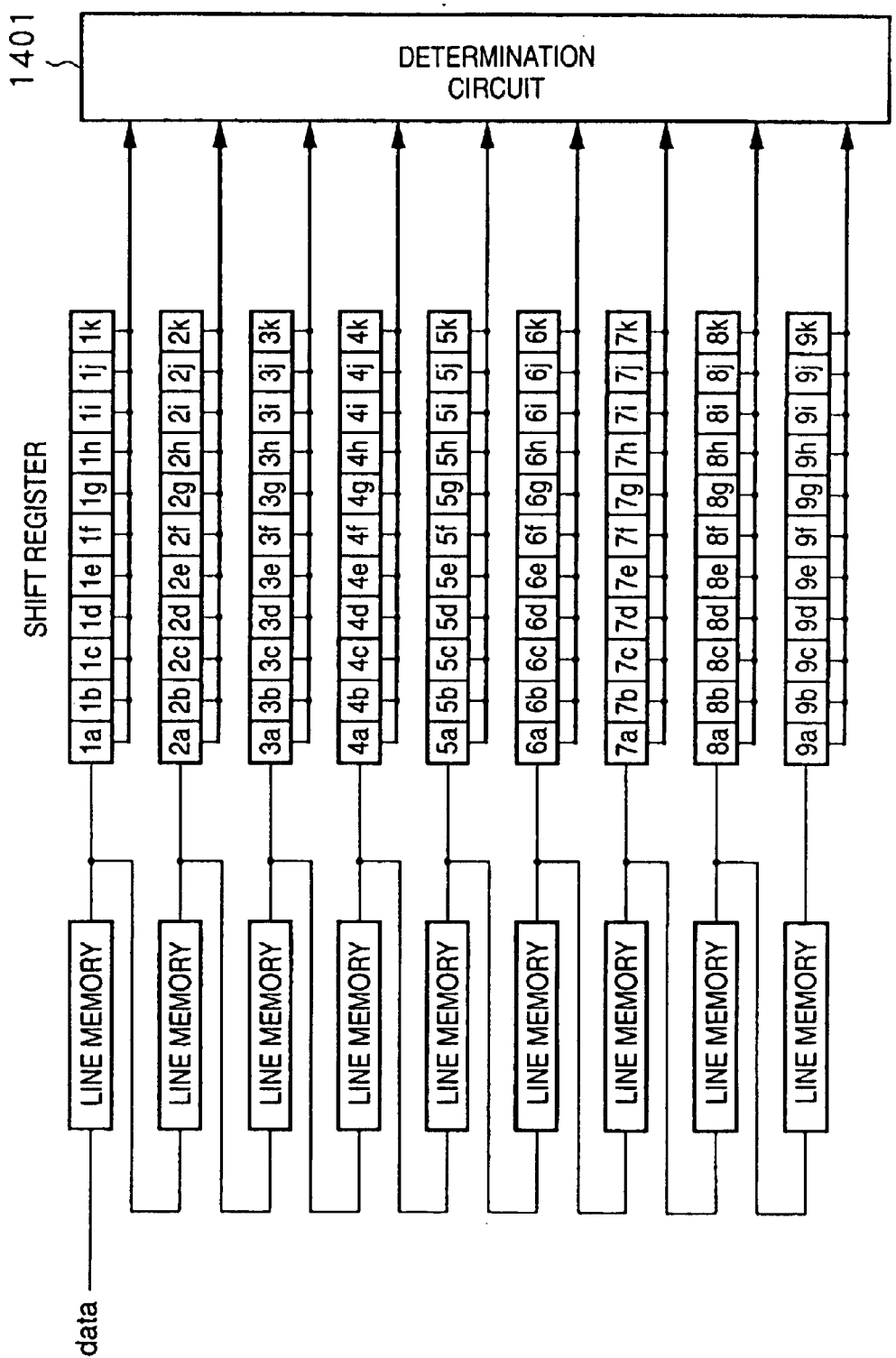
FIG. 15 is a diagram for explaining a pattern matching circuit of the embodiment shown in FIG. 1.

The pattern matching circuit 1102 will be explained below. FIG. 15 is a detailed block diagram of the circuit 1102. When a 400-dpi image signal is sent from the controller to the printer in synchronism with video clocks, image dot data are stored in turn in line memories 1 to 9, and dot matrix information of 11 main scan dots×9 sub-scan dots of the dot data stored in line memories 1 to 90 is extracted to shift registers 1 to 9. After that, a determination circuit 1401 detects a feature of the dot matrix information. Since various proposals have been made for pattern matching, and an appropriate one of such methods is used, a detailed description thereof will be omitted.

The smoothing circuit 1103 will be described in detail below.

Figure 16:
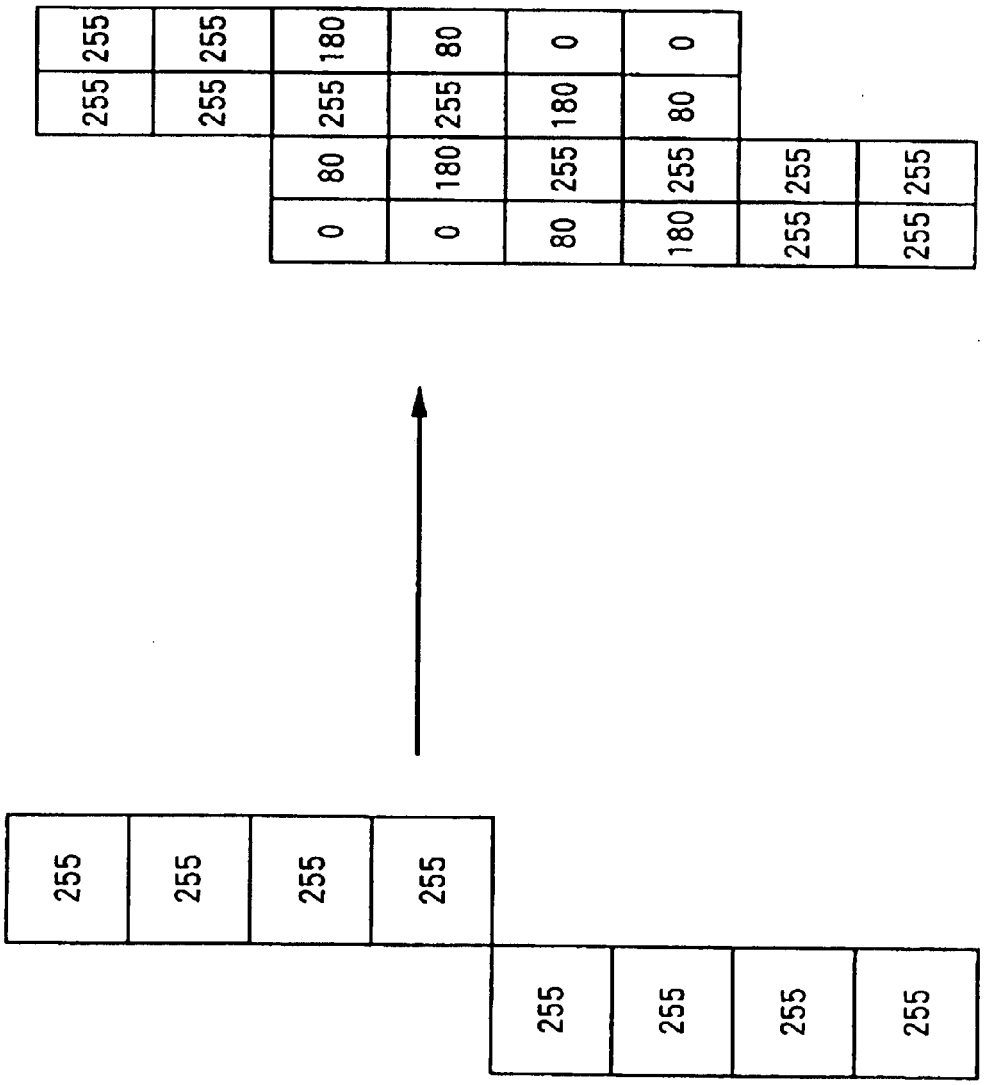
FIG. 16 is a view for explaining a smoothing process in the embodiment shown in FIG. 1.

FIG. 16 depicts an example of smoothing of a line with one pixel width of rendered density data "255". In this manner, the interpolation amount of data is replaced by multi-valued data in accordance with the input pattern. Furthermore, since the input image has a multi-valued grayscale pattern, "0" or "255" data is not always input.

Figure 17:
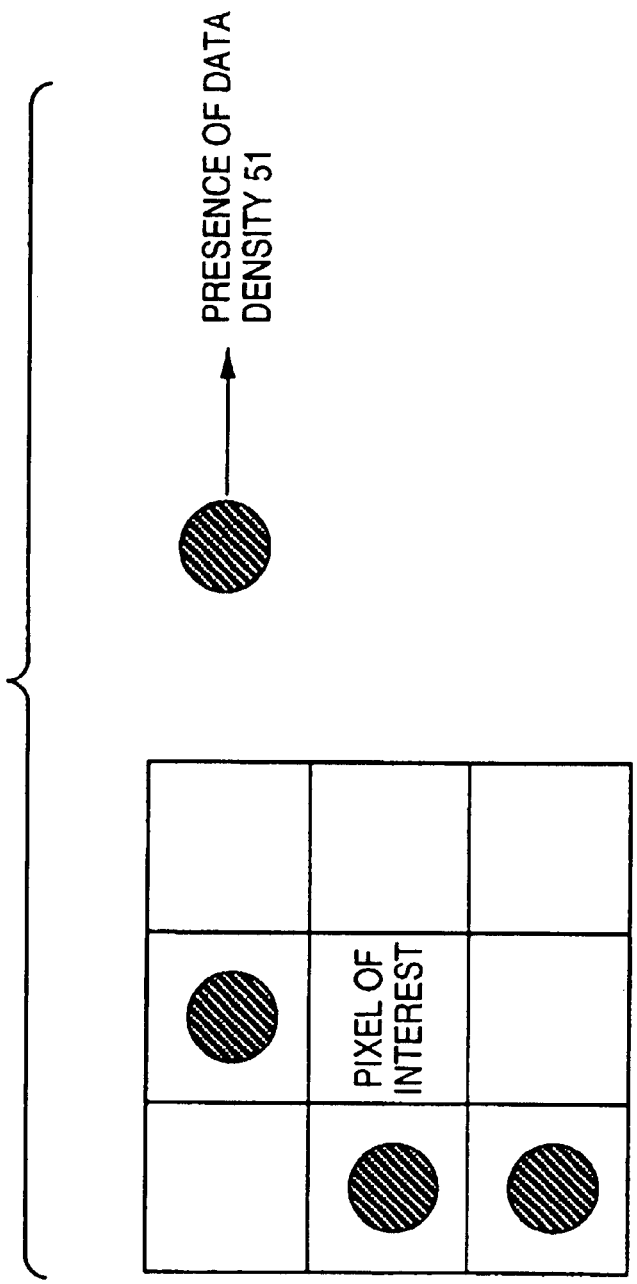
FIG. 17 is a view for explaining a smoothing process in the embodiment shown in FIG. 1.

Hence, the multi-valued pattern of the input image is checked using a 3×3 window, as shown in FIG. 17. That is, the number of data other than zero is counted within the 3×3 window, and the data other than zero are averaged to linearly compute data to be smoothed, thus implementing data interpolation. An example will be explained below.

As shown in FIG. 17, the number of data other than zero is 3 (pixels) within the 3×3 window. That is, $$(51 \times 3)/3 = 51 \quad (1)$$

$$180 \times 51/255 = 36 \quad (2)$$

When the value to be replaced in FIG. 15 is "180" in equation (2), data "36" as a result according to the input density data is interpolated in correspondence with the pattern. As a result, the resolution is doubled (400 lines→800 lines).

As described above, since only an edge boundary portion undergoes a high-resolution process, different resolution processes in units of planes can be inhibited, and as a result, nonuniformity can be reduced. Furthermore, since image data undergoes smoothing using interpolation, nonuniformity can be reduced without impairing the character reproducibility.

In both the first and second embodiments, the raster image processor 13 shown in FIG. 1 is interposed between the host computer 10 and color copying machine 18. Alternatively, the raster image processor 13 may be incorporated in the color copying machine.

When the printer driver 12 of the host computer 10 frame-sequentially outputs recording color component data, and also outputs attribute information described in the above embodiment, a need for the raster image processor shown in FIG. 1 can be obviated.

As described above, when the color copying machine is used as a printer that receives print data from an information processing apparatus such as a personal computer (the printer can receive data via a network), a higher-quality image can be provided to the user using PDL attribute information and the image area separation circuit mounted in the color copying machine. In this case, image quality is highly likely to deteriorate due to determination errors if CG image data or the like are sent via a YMCK interface, but such problem can be avoided by the above embodiment.

To recapitulate, a full-color image input from an external apparatus can undergo an optimal adaptive process using the image area separation circuit mounted in the color copying machine main body, and also attribute map information, thus providing a higher-quality image.

Furthermore, since an image can be inhibited from being reproduced at different resolutions in units of planes, nonuniformity can be removed. In addition, a character portion is smoothed to improve character reproducibility.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus rendering an image from a command by generating attribute information and bitmap image data, said apparatus comprising:

attribute information generation means for generating attribute information indicating an attribute of the image from the command indicating the image;

bitmap image data generation means for generating bitmap image data by rendering the command;

image area separation means for detecting at least an edge of the bitmap image generated by said bitmap image data generation means and for performing image area separation of the bitmap image data on the basis of the detected edge; and control means for controlling an image process for the bitmap image data on the basis of the attribute information and the image area separation performed by said image area separation means in a copy mode, while controlling the image processing of the bitmap image data without using the image area separation performed by said image area separation means in a print mode.

2. An apparatus according to claim 1, wherein the image process performed by said apparatus is a resolution switching process.

3. An apparatus according to claim 1, wherein image area separation performed by said image area separation means includes determination of character thickness.

4. An apparatus according to claim 1, wherein the image process performed by said apparatus is a multi-valued black character process.

5. An apparatus according to claim 1, wherein the image rendered by said apparatus includes a computer graphics image.

6. An apparatus according to claim 1, wherein the image process performed by said apparatus, without using the image separation performed by said image area separation means, prevents an image from being recorded at different resolutions in units of color planes that form the image.

7. An apparatus according to claim 1, wherein an area of the image which is determined to be a character on the basis of at least one of the attribute information and the image area separation performed by said image area separation means undergoes a smoothing process.

8. An apparatus according to claim 7, wherein the resolution of the area is increased by the smoothing process.

9. An apparatus according to claim 1, wherein the attribute information generated by said attribute information generation means includes at least one of a character flag, an edge flag, and an edge boundary flag.

10. A color image processing method for rendering an image from a command by generating attribute information and bitmap image data, said method comprising:
    an attribute information generation step of generating attribute information indicating an attribute of the image from the command indicating the image;
    a bitmap image data generation step of generating bitmap image data by rendering the command;
    an image area separation step of detecting at least an edge of the bitmap image generated in said bitmap image data generation step and performing image area separation of the bitmap image data on the basis of the detected edge; and
    a control step of controlling an image process for the bitmap image data on the basis of the attribute information and the image area separation performed in said image area separation step in a copy mode, while controlling the image processing of the bitmap image data without using the image area separation performed in said image area separation step in a print mode.

11. A method according to claim 10, wherein the image process performed by said method is a resolution switching process.

12. A method according to claim 10, wherein image area separation performed in said image area separation step includes determination of character thickness.

13. A method according to claim 10, wherein the image process performed by said method is a multi-valued black character process.

14. A method according to claim 10, wherein the image rendered by said method includes a computer graphics image.

15. A method according to claim 10, wherein the image process performed by said method, without using the image area separation performed in said image area separation step, prevents an image from being recorded at different resolutions in units of color planes that form the image.

16. A method according to claim 10, wherein an area of the image which is determined to be a character on the basis of at least one of the attribute information and the image area separation performed in said image area separation step undergoes a smoothing process.

17. A method according to claim 16, wherein the resolution of the area is increased by the smoothing process.

18. A method according to claim 10, wherein the attribute information generated in said attribute information generation step includes at least one of a character flag, an edge flag, and an edge boundary flag.

19. A storage medium for storing a program for executing a color image processing method for rendering an image from a command by generating attribute information and bitmap image data, said program comprising:
    code for an attribute information generation step of generating attribute information indicating an attribute of the image from the command indicating the image;
    code for a bitmap image data generation step of generating bitmap image data by rendering the command;
    code for an image area separation step of detecting at least an edge of the bitmap image generated by said bitmap image data generation code and performing image area separation of the bitmap image data on the basis of the detected edge; and
    code for a control step of controlling an image process for the bitmap image data on the basis of the attribute information and the image area separation performed by said image area separation code in a copy mode, while controlling the image processing of the bitmap image data without using the image area separation performed by said image area separation code in a print mode.

20. A storage medium according to claim 19, wherein the image process performed by the program stored in said storage medium is a resolution switching process.

21. A storage medium according to claim 19, wherein said image area separation step performed by said image area separation code includes determination of character thickness.

22. A storage medium according to claim 19, wherein the image process performed by the program stored in said storage medium is a multi-valued black character process.

23. A storage medium according to claim 19, wherein the image rendered by the program stored in said storage medium includes a computer graphics image.

24. A storage medium according to claim 19, wherein the image process performed by the program stored in said storage medium, without using the image area separation performed by said image area separation code, prevents an image from being recorded at different resolutions in units of color planes that form the image.

25. A storage medium according to claim 19, wherein an area of the image which is determined to be a character on the basis of at least one of the attribute information and the image area separation performed by said image area separation code undergoes a smoothing process.

26. A storage medium according to claim 25, wherein the resolution of the area is increased by the smoothing process.

27. A storage medium according to claim 19, wherein the attribute information generated by said attribute information generation code includes at least one of a character flag, an edge flag, and an edge boundary flag.

28. An apparatus according to claim 1, wherein said image area separation means detects character thickness in the bitmap image data generated by said bitmap image data generation means to perform image area separation of the bitmap data.

29. A color image processing apparatus rendering an image from a command by generating attribute information and bitmap image data, said apparatus comprising:
    attribute information generation means for generating attribute information indicating an attribute of the image from the command indicating the image;
    bitmap image data generation means for generating bitmap image data by rendering the command;
    image area separation means for detecting at least an edge of the bitmap image generated by said bitmap image data generation means and for performing image area separation of the bitmap image data on the basis of the detected edge; and
    control means for changing the resolution at the detected edge portion of the bitmap image, detected by said image area separation means, to a higher resolution on the basis of the attribute information and the image area separation performed by said image area separation means.

30. A color image processing method for rendering an image from a command by generating attribute information and bitmap image data, said method comprising:

an attribute information generation step of generating attribute information indicating an attribute of the image from the command indicating the image;

a bitmap image data generation step of generating bitmap image data by rendering the command;

an image area separation step of detecting at least an edge of the bitmap image generated in said bitmap image data generation step and performing image area separation of the bitmap image data on the basis of the detected edge; and a control step of changing the resolution at the detected edge portion of the bitmap image, detected in said image area separation step, to a higher resolution on the basis of the attribute information and the image area separation performed in said image area separation step.

* * * * *

UNITED STATES PATENT AND TRADEMARK OFFICE
CERTIFICATE OF CORRECTION

| | |
|---|---|
| PATENT NO. | : 7,057,764 B1 |
| APPLICATION NO. | : 09/521379 |
| DATED | : June 6, 2006 |
| INVENTOR(S) | : Tsutomu Sakaue |

It is certified that error appears in the above-identified patent and that said Letters Patent is hereby corrected as shown below:

Drawings:

SHEET 11

"DETECTIOR" should read --DETECTOR--.

SHEET 19

Replace with attached amended Fig. 19.

COLUMN 2

Line 11, "comprises" should read --comprises:--.

COLUMN 4

Line 11, "allows" should read --is able--.

COLUMN 10

Line 61, "various" should read --variety of--.

COLUMN 12

Line 25, "imparing" should read --being impared--.

CLAIMS 1-30 SHOULD BE DELETED AND SUBSTITUTED WITH THE FOLLOWING CLAIMS 1-30:

Col. 14

--1. A color image processing apparatus rendering an image from a command by generating attribute information and bitmap image data, said apparatus comprising:

attribute information generation means for generating attribute information indicating an attribute of the image from the command indicating the image;

UNITED STATES PATENT AND TRADEMARK OFFICE
CERTIFICATE OF CORRECTION

PATENT NO. : 7,057,764 B1
APPLICATION NO. : 09/521379
DATED : June 6, 2006
INVENTOR(S) : Tsutomu Sakaue It is certified that error appears in the above-identified patent and that said Letters Patent is hereby corrected as shown below:

bitmap image data generation means for generating bitmap image data by rendering the command;

scanning means for generating scanned image data of a scanned image;

image area separation means for detecting at least an edge of the bitmap image generated by said bitmap image data generation means or the scanned image and for performing image area separation of the bitmap image data or the scanned image on the basis of the detected edge; and control means for controlling an image process for the scanned image data of the scanned image on the basis of the image area separation performed by said image area separation means in a copy mode, while controlling the image processing of the bitmap image data on the basis of the attribute information, without using the image area separation performed by said image area separation means in a specific mode other than the copy mode.

2. An apparatus according to claim 1, wherein the image process performed by said apparatus is a resolution switching process.

3. An apparatus according to claim 1, wherein image area separation performed by said image area separation means includes determination of character thickness.

4. An apparatus according to claim 1, wherein the image process performed by said apparatus is a multi-valued black character process.

5. An apparatus according to claim 1, wherein the image rendered by said apparatus includes a computer graphics image.

6. An apparatus according to claim 1, wherein the image process performed by said apparatus, without using the image separation performed by said image area separation means, prevents an image from being recorded at different resolutions in units of color planes that form the image.

UNITED STATES PATENT AND TRADEMARK OFFICE
CERTIFICATE OF CORRECTION

| | | |
|---|---|---|
| PATENT NO. | : 7,057,764 B1 | |
| APPLICATION NO. | : 09/521379 | |
| DATED | : June 6, 2006 | |
| INVENTOR(S) | : Tsutomu Sakaue | |

It is certified that error appears in the above-identified patent and that said Letters Patent is hereby corrected as shown below:

7.     An apparatus according to claim 1, wherein an area of the image which is determined to be a character on the basis of at least one of the attribute information and the image area separation performed by said image area separation means undergoes a smoothing process.--

Col. 15

--8.     An apparatus according to claim 7, wherein the resolution of the area is increased by the smoothing process.

9.     An apparatus according to claim 1, wherein the attribute information generated by said attribute information generation means includes at least one of a character flag, an edge flag, and an edge boundary flag.

10.     A color image processing method for rendering an image from a command by generating attribute information and bitmap image data, said method comprising:

an attribute information generation step of generating attribute information indicating an attribute of the image from the command indicating the image;

a bitmap image data generation step of generating bitmap image data by rendering the command;

a scanning step of generating scanned image data of a scanned image;

an image area separation step of detecting at least an edge of the bitmap image generated in said bitmap image data generation step or the scanned image and performing image area separation of the bitmap image data or the scanned image on the basis of the detected edge; and a control step of controlling an image process for the scanned image data of the scanned image on the basis of the image area separation performed in said image area separation step in a copy mode, while controlling the image processing of the bitmap image data on the basis of the attribute information, without using the image area separation performed in said image area separation step in a specific mode other than the copy mode.

UNITED STATES PATENT AND TRADEMARK OFFICE
CERTIFICATE OF CORRECTION

PATENT NO.       : 7,057,764 B1
APPLICATION NO.  : 09/521379
DATED            : June 6, 2006
INVENTOR(S)      : Tsutomu Sakaue It is certified that error appears in the above-identified patent and that said Letters Patent is hereby corrected as shown below:

11.    A method according to claim 10, wherein the image process performed by said method is a resolution switching process.

12.    A method according to claim 10, wherein image area separation performed in said image area separation step includes determination of character thickness.

13.    A method according to claim 10, wherein the image process performed by said method is a multi-valued black character process.

14.    A method according to claim 10, wherein the image rendered by said method includes a computer graphics image.

15.    A method according to claim 10, wherein the image process performed by said method, without using the image area separation performed in said image area separation step, prevents an image from being recorded at different resolutions in units of color planes that form the image.

16.    A method according to claim 10, wherein an area of the image which is determined to be a character on the basis of at least one of the attribute information and the image area separation performed in said image area separation step undergoes a smoothing process.

17.    A method according to claim 16, wherein the resolution of the area is increased by the smoothing process.

18.    A method according to claim 10, wherein the attribute information generated in said attribute information generation step includes at least one of a character flag, an edge flag, and an edge boundary flag.

19.    A storage medium for storing a program for executing a color image processing method for rendering an image from a command by generating attribute information and bitmap image data, said program comprising:

UNITED STATES PATENT AND TRADEMARK OFFICE
CERTIFICATE OF CORRECTION

| | | |
|---|---|---|
| PATENT NO. | : 7,057,764 B1 | |
| APPLICATION NO. | : 09/521379 | |
| DATED | : June 6, 2006 | |
| INVENTOR(S) | : Tsutomu Sakaue | |

It is certified that error appears in the above-identified patent and that said Letters Patent is hereby corrected as shown below:

code for an attribute information generation step of generating attribute information indicating an attribute of the image from the command indicating the image;

code for a bitmap image data generation step of generating bitmap image data by rendering the command;

code for a scanning step of generating scanned image data of a scanned image;

code for an image area separation step of detecting at least an edge of the bitmap image generated by said bitmap image data generation code or the scanned image and performing image area separation of the bitmap image data or the scanned image on the basis of the detected edge; and code for a control step of controlling an image process for the scanned image data of the scanned image on the basis of the image area separation performed by said image area separation code in a copy mode, while controlling the image processing of the bitmap image data on the basis of the attribute information without using the image area separation performed by said image area separation code in a specific mode other than the copy mode.--

Col. 16

--20.    A storage medium according to claim 19, wherein the image process performed by the program stored in said storage medium is a resolution switching process.

21.    A storage medium according to claim 19, wherein said image area separation step performed by said image area separation code includes determination of character thickness.

22.    A storage medium according to claim 19, wherein the image process performed by the program stored in said storage medium is a multi-valued black character process.--

UNITED STATES PATENT AND TRADEMARK OFFICE
CERTIFICATE OF CORRECTION

PATENT NO. : 7,057,764 B1
APPLICATION NO. : 09/521379
DATED : June 6, 2006
INVENTOR(S) : Tsutomu Sakaue It is certified that error appears in the above-identified patent and that said Letters Patent is hereby corrected as shown below:

23. A storage medium according to claim 19, wherein the image rendered by the program stored in said storage medium includes a computer graphics image.

24. A storage medium according to claim 19, wherein the image process performed by the program stored in said storage medium, without using the image area separation performed by said image area separation code, prevents an image from being recorded at different resolutions in units of color planes that form the image.

25. A storage medium according to claim 19, wherein an area of the image which is determined to be a character on the basis of at least one of the attribute information and the image area separation performed by said image area separation code undergoes a smoothing process.

26. A storage medium according to claim 25, wherein the resolution of the area is increased by the smoothing process.

27. A storage medium according to claim 19, wherein the attribute information generated by said attribute information generation code includes at least one of a character flag, and edge flag, and an edge boundary flag.

28. An apparatus according to claim 1, wherein said image area separation means detects character thickness in the bitmap image data generated by said bitmap image data generation means to perform image area separation of the bitmap data.

29. A color image processing apparatus rendering an image from a command by generating attribute information and bitmap image data, said apparatus comprising:

attribute information generation means for generating attribute information indicating an attribute of the image from the command indicating the image;

bitmap image data generation means for generating bitmap image data by rendering the command;

UNITED STATES PATENT AND TRADEMARK OFFICE
CERTIFICATE OF CORRECTION

| | |
|---|---|
| PATENT NO. | : 7,057,764 B1 |
| APPLICATION NO. | : 09/521379 |
| DATED | : June 6, 2006 |
| INVENTOR(S) | : Tsutomu Sakaue |

It is certified that error appears in the above-identified patent and that said Letters Patent is hereby corrected as shown below:

image area separation means for detecting at least an edge of the bitmap image generated by said bitmap image data generation means and for performing image area separation of the bitmap image data on the basis of the detected edge; and control means for changing the resolution at the detected edge portion of the bitmap image, detected by said image area separation means, to a higher resolution on the basis of the attribute information and the image area separation performed by said image area separation means.--

Col. 17

--30. A color image processing method for rendering an image from a command by generating attribute information and bitmap image data, said method comprising:

an attribute information generation step of generating attribute information indicating an attribute of the image from the command indicating the image;

a bitmap image data generation step of generating bitmap image data by rendering the command;

an image area separation step of detecting at least an edge of the bitmap image generated in said bitmap image data generation step and performing image area separation of the bitmap image data on the basis of the detected edge; and

UNITED STATES PATENT AND TRADEMARK OFFICE
CERTIFICATE OF CORRECTION

| | | |
|---|---|---|
| PATENT NO. | : 7,057,764 B1 | |
| APPLICATION NO. | : 09/521379 | |
| DATED | : June 6, 2006 | |
| INVENTOR(S) | : Tsutomu Sakaue | |

It is certified that error appears in the above-identified patent and that said Letters Patent is hereby corrected as shown below:

a control step of changing the resolution at the detected edge portion of the bitmap image, detected in said image area separation step, to a higher resolution on the basis of the attribute information and the image area separation performed in said image area separation step.--

Signed and Sealed this

Twenty-ninth Day of July, 2008

JON W. DUDAS
*Director of the United States Patent and Trademark Office*